(12) United States Patent
Mun et al.

(10) Patent No.: US 11,188,033 B2
(45) Date of Patent: Nov. 30, 2021

(54) WEARABLE DEVICE COMPRISING MICROPHONE FOR OBTAINING SOUND BY USING PLURALITY OF OPENINGS

(71) Applicant: Samsung Electronics Co., Ltd., Gyeonggi-do (KR)

(72) Inventors: Seokhyun Mun, Gyeonggi-do (KR); Minwoo Yoo, Gyeonggi-do (KR); Junghyeon Kim, Gyeonggi-do (KR); Valeriy Prushinskiy, Gyeonggi-do (KR); Daegi Lee, Gyeonggi-do (KR); Junyoung Lee, Gyeonggi-do (KR); Changryong Heo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/969,502

(22) PCT Filed: Feb. 14, 2019

(86) PCT No.: PCT/KR2019/001843
§ 371 (c)(1),
(2) Date: Aug. 12, 2020

(87) PCT Pub. No.: WO2019/160366
PCT Pub. Date: Aug. 22, 2019

(65) Prior Publication Data
US 2020/0401087 A1    Dec. 24, 2020

(30) Foreign Application Priority Data

Feb. 14, 2018    (KR) .................. 10-2018-0018474

(51) Int. Cl.
G06F 3/01 (2006.01)
G04G 21/06 (2010.01)
(Continued)

(52) U.S. Cl.
CPC .............. *G04G 21/06* (2013.01); *G04G 9/007* (2013.01); *G04G 17/08* (2013.01); *G06F 3/017* (2013.01); *H04R 1/08* (2013.01)

(58) Field of Classification Search
CPC ........ G04G 21/06; G04G 9/007; G04G 17/08; G06F 3/017
See application file for complete search history.

(56) References Cited

U.S. PATENT DOCUMENTS 9,847,093 B2    12/2017  Lee et al.
10,062,388 B2    8/2018  Ady et al.
(Continued)

FOREIGN PATENT DOCUMENTS

KR        101366173      2/2014
KR       1020140106849   9/2014
(Continued)

OTHER PUBLICATIONS

PCT/ISA/210 Search Report issued on PCT/KR2019/001843, dated Jun. 11, 2019, pp. 5.
(Continued)

*Primary Examiner* — David E Choi
(74) *Attorney, Agent, or Firm* — The Farrell Law Firm, P.C.

(57) ABSTRACT

A wearable device according to various embodiments of the present disclosure may include a housing forming at least a part of an exterior of the wearable device, a plurality of openings formed in at least a partial region of the housing, an elastic body disposed inside the housing and including a passage spatially connected with the plurality of openings, and at least one microphone sensing vibration introduced from the outside via the plurality of openings and the passage.

15 Claims, 18 Drawing Sheets

(51) Int. Cl.
  *G04G 9/00*       (2006.01)
  *G04G 17/08*      (2006.01)
  *H04R 1/08*       (2006.01)

(56) References Cited

U.S. PATENT DOCUMENTS

2015/0169072 A1*  6/2015  Wei ..................... G06F 3/04842
                                                          345/156
2016/0372135 A1* 12/2016  Lee ......................... G10L 19/06
2017/0116995 A1   4/2017  Ady et al.
2018/0188894 A1*  7/2018  Feinstein ................ G04G 21/08
2020/0401087 A1* 12/2020  Mun ........................ H04R 1/08

FOREIGN PATENT DOCUMENTS

KR    2020160000825    3/2016
KR    1020180005881    1/2018

OTHER PUBLICATIONS

PCT/ISA/237 Written Opinion issued on PCT/KR2019/001843, dated Jun. 11, 2019, pp. 3.

\* cited by examiner

WEARABLE DEVICE COMPRISING MICROPHONE FOR OBTAINING SOUND BY USING PLURALITY OF OPENINGS

PRIORITY

This application is a National Phase Entry of PCT International Application No. PCT/KR2019/001843 which was filed on Feb. 14, 2019, and claims priority to Korean Patent Application No. 10-2018-0018474, which was filed on Feb. 14, 2018, the entire contents of each of which is incorporated herein by reference.

TECHNICAL FIELD

Various embodiments of the present disclosure relate to a wearable device comprising a microphone for obtaining sound by using a plurality of openings.

BACKGROUND ART

Various types of wearable devices such as smartwatches, smart bands, and smart glasses are being released. The wearable device may be worn on a body part of a user (e.g., wrist). The wearable device may perform various functions such as memo writing, notification, schedule management, and biometric information collection.

DISCLOSURE OF THE INVENTION

Technical Problem

The wearable device according to the related art is operated by a two-hand control method by a user (e.g., one hand used for wearing and the other hand used for touch or bezel rotation), or a one-hand control method (e.g., one hand used for wearing and then lifting or turning the wrist—using an acceleration sensor, bone conduction microphone). The two-hand control method may be inconvenient to use the wearable device if it is not possible for the user to use his or her one hand (e.g., when the user is holding an object in the hand). The one-hand control method has a limitation in that the resolution of the acceleration sensor should be high in order to recognize the motion of one hand of the user and the space required to mount the bone conduction microphone for recognizing the motion of one hand of the user should be increased.

Technical Solution

A wearable device according to various embodiments of the present disclosure may include a housing forming at least a part of an exterior of the wearable device, a plurality of openings formed in at least a partial region of the housing, an elastic body disposed inside the housing and including a passage spatially connected with the plurality of openings, and at least one microphone sensing vibration introduced from the outside via the plurality of openings and the passage.

Advantageous Effects

The wearable device according to various embodiments of the present disclosure is capable of recognizing a user's hand gesture by disposing a plurality of microphone holes in a side housing that abuts a body part (e.g., back of the hand, wrist).

The wearable device according to various embodiments of the present disclosure may distinctively recognize a hitting motion of the thumb and the index finger of a user, a hitting motion of the thumb and the middle finger, and the like, and may be configured to perform different functions according to the respective recognized motion.

BRIEF DESCRIPTION OF THE DRAWINGS

FIG. 8 is exemplary and is not limited thereto.

MODE FOR CARRYING OUT THE INVENTION

Figure 1:
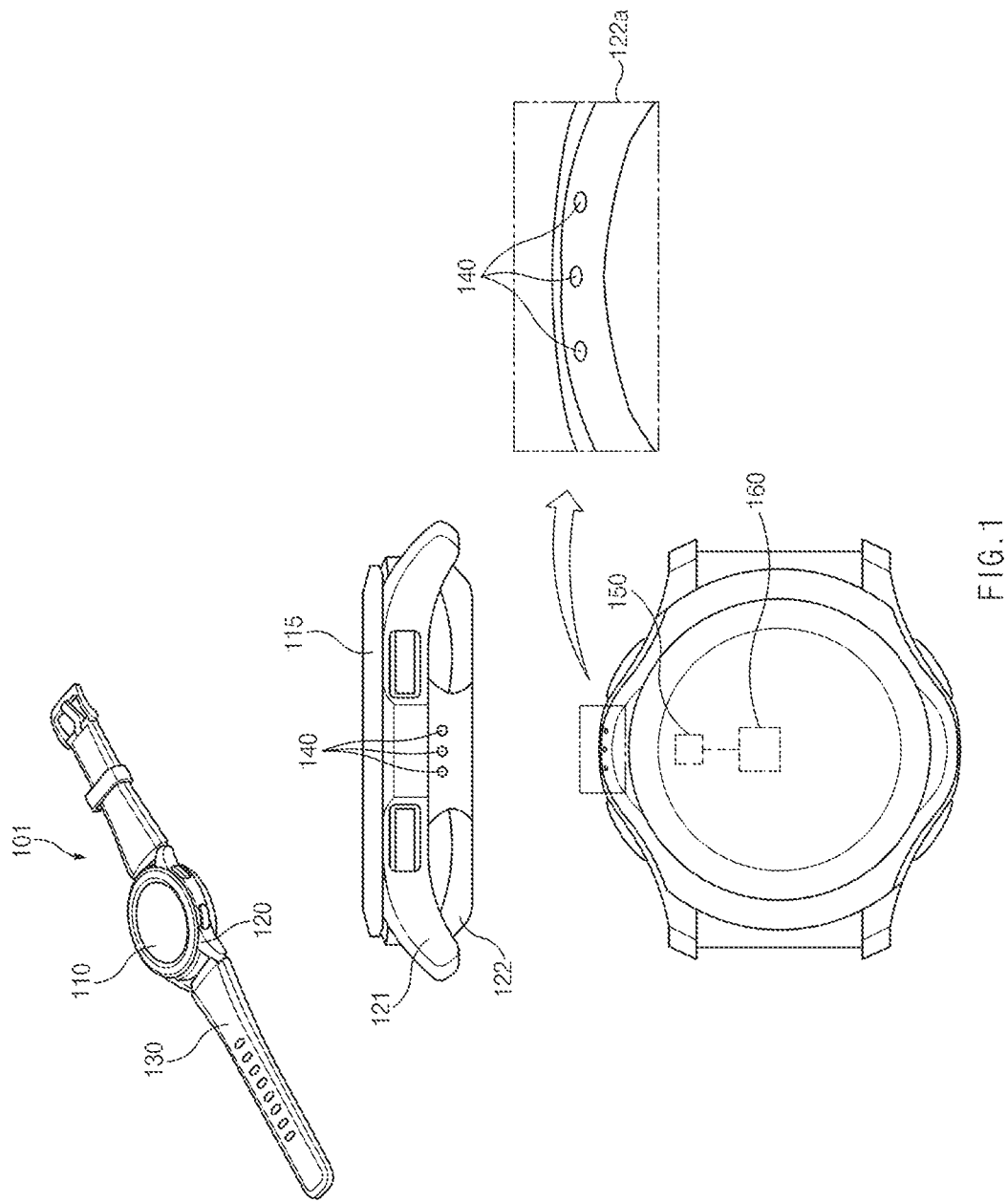
FIG. 1 illustrates a wearable device according to various embodiments.

Hereinafter, various embodiments disclosed in the present disclosure will be described with reference to the accompanying drawings. However, this is not intended to limit the technologies disclosed in the present disclosure to the specific embodiments, and it is to be construed to include various modifications, equivalents, and/or alternatives of embodiments of the present disclosure. With regard to the description of the drawings, similar reference numerals may be used to refer to similar elements.

As used here, terms and phrases such as "have", "may have", "include", or "may include" indicates the existence of features (e.g., numbers, functions, actions, or parts such as components), and do not exclude the existence of additional features.

As used here, the phrases "A or B", "at least one of A or/and B", or "one or more of A or/and B" may include all possible combinations of the items listed together. For example, "A or B", "at least one of A and B", or "at least one of A or B" may indicate all of (1) including at least one A, (2) including at least one B, or (3) including both at least one A and at least one B.

As used here, the terms such as "first", "second", "the first", or "the second" may modify various components, regardless of order and/or importance, and are used to distinguish one component from another, but does not limit the components. For example, the first user device and the second user device may indicate different user devices regardless of order or importance. For example, without departing from the teachings disclosed in the present disclosure, a first element could be termed a second element, and similarly, in reverse, a second element could be termed a first element.

When a component (e.g., first component) is referred to as being "(operatively or communicatively) coupled with/to" or "connected to" another component (e.g., second component), it should be understood that any of the above components may be directly connected to another component, or may be connected via another component (e.g., a third component). In contrast, when a certain component (e.g., first component) is referred to as being "directly coupled" or "directly connected" to another component (e.g., the second component), it is to be understood that no other component (e.g., third component) intervenes between the certain component and the other component.

As used here, the phrase, "configured to (or set to)", may be interchangeably used with, for example, "suitable for", "having the capacity to", "designed to", "adapted to", "made to", or "capable of", depending on the circumstances. The phase "configured (or set) to" may not necessarily mean only "specifically designed to" in hardware. Rather, in some circumstances, the phase "device configured to" may mean that the device "can" perform an operation with other devices or parts. For example, the phrase "processor configured (or set) to perform A, B, and C" may mean a dedicated processor (e.g., embedded processor) for performing corresponding operations, or a generic-purpose processor (e.g., CPU or application processor) that performs the operations by executing one or more software programs stored in a memory device.

The terms and phrases as used here are merely provided to describe specific embodiments, and may not be intended to limit the scope of other embodiments. A singular form is intended to include a plural form, unless the context clearly indicates otherwise. Terms, including technical or scientific terms, as used here, may have the same meaning as commonly understood by a person skilled in the art to which the embodiments of the present disclosure belong. Terms such as those defined in commonly-used dictionaries should be interpreted as having a meaning that is consistent with their meaning in the context of the relevant art and will not be interpreted in an idealized or overly formal sense unless expressly so defined here. In some cases, even terms defined here may be interpreted to exclude embodiments of the present disclosure.

The Wearable device according to various embodiments of the present disclosure may include at least one of an accessory-type device (e.g., watches, rings, bracelets, anklets, necklaces, glasses, contact lenses, or head-mounted devices (HMD), a textiles or clothing integrated-type device (e.g., electronic clothing), a body attachment-type device (e.g., skin pads or tattoo), or a bio-implantable-type device (e.g., implantable circuits).

Hereinafter, a wearable device according to various embodiments will be described with reference to the accompanying drawings. In the present disclosure, the term user may refer to a person using a wearable device or a device using the wearable device (e.g., an artificial intelligence electronic device).

FIG. 1 illustrates a wearable device according to various embodiments. In FIG. 1, a case in which a wearable device 101 is a smartwatch is exemplarily illustrated; however, the present disclosure is not limited thereto.

Referring to FIG. 1, the wearable device 101 may include a display 110, a housing 120, and a strap 130.

The display (or display module) 110 may output content such as text or images. The display 110 may include a display panel or a touch panel therein. For example, the display 110 may display user interfaces of applications. The display 110 may receive a touch input of a user and transmit it to an internal processor 160.

The housing (or main body) 120 may fix the display 110 and protect various internal components. The housing 120 may include a button, a sensor window, or a speaker on the outside. The housing 120 may include a structure for connection with the strap 130.

The housing 120 may include various components such as the processor 160, a memory, a printed circuit board (or main board), a microphone 150, or a battery required for driving the wearable device 101 therein.

According to various embodiments, the housing 120 may include a first housing 121 and a second housing 122.

The first housing (or front housing, upper housing) 121 may cover an output surface (hereinafter, a front surface) of the display 110 and a portion of a side surface. The first housing 121 may be coupled with the second housing 122 to accommodate the display 110, physical buttons, speakers, and the like. The first housing 121 may include a connecting structure for connection with the strap 130.

According to various embodiments, the first housing 121 may include a wheel 115 that is rotatable around the display 110. The wheel 115 may rotate in the clockwise direction or in the counterclockwise direction. Depending on the rotation direction/rotation angle of the wheel 115, a user interface displayed on the display 110 may be changed or moved.

The second housing (or back housing, lower housing) 122 may cover the surface opposite to the output surface (hereinafter, a back surface) of the display 110 and a portion of the side surface.

According to various embodiments, the second housing 122 may include a plurality of openings 140 for transmitting sound or vibration generated from the outside to the microphone 150 inside the wearable device 101. If the user wears the wearable device 101 on the wrist, the plurality of openings 140 may be disposed at a position where at least some of the openings are covered by the back of the hand depending on the movement of the hand or wrist of the user.

In FIG. 1, a case is exemplarily illustrated where three openings are disposed in a row on the side surface of the wearable device 101; however, the present disclosure is not limited thereto. For example, the number of the plurality of openings 140 may be two or four. In addition, the plurality of openings 140 may be disposed in a triangular shape or a square shape.

In FIG. 1, a case is exemplarily illustrated where the plurality of openings 140 are disposed in the second housing (or back housing, lower housing) 122; however, the present disclosure is not limited thereto. For example, the plurality of openings 140 may be disposed in the first housing (or front housing, upper housing) 121.

According to an embodiment, the plurality of openings 140 may all have the same diameter. Through this, it is possible to give a user a sense of unity in terms of design when viewed from the outside.

According to another embodiment, at least some of the plurality of openings 140 may have different diameters. For example, the plurality of openings 140 may gradually increase in diameter or decrease in diameter according to a disposed order. For another example, the openings disposed relatively near the center of the plurality of openings 140 may be relatively large in diameter, and the openings disposed toward the right and left may be relatively small in diameter and may have the same size with each other.

According to various embodiments, the plurality of openings 140 may be formed in a portion of the housing 120 that has a convex in an outward direction. If the user wears the wearable device 101 on the wrist, the plurality of openings 140 may be different from each other in a degree to which the back of the hand covers (blocks) the openings by the movement of the hand or wrist of the user.

According to various embodiments, at least some of the plurality of openings 140 may be disposed to be in contact with or be blocked by a body part of the user in the process of using the wearable device 101 by the user. For example, if the user wears the wearable device 101 on the wrist, one of the plurality of openings 140 may be blocked by a portion of the back of the hand of the user. In this state, when the user generates a tapping operation using fingers (e.g., a tapping operation of the thumb and the index finger, or a tapping operation of the thumb and the middle finger), the vibration corresponding to each tapping operation (e.g., vibration of air due to tapping sound or vibration of a portion of the back of the hand due to tapping) may be transmitted to the microphone 150 therein through the plurality of openings 140. Additional information regarding the plurality of openings 140 may be provided through FIGS. 2 to 5.

The microphone 150 may pick up sound or vibration generated from the outside, and convert it into an electrical signal. For example, the microphone 150 may convert sound into vibration and convert vibration into an electrical signal. For another example, the microphone 150 may convert trembling due to vibration transmitted from the outside into an electrical signal.

The microphone 150 may provide the received signal to the processor 160. The microphone 150 may be turned on/off according to the control of the processor 160.

The processor 160 may perform various data processing and operations for driving the wearable device 101. For example, the processor 160 may execute an application and display an associated execution screen on the display 110. The processor 160 may drive an application in response to information collected through a sensor or a user input, and may control a user interface output through the display 110.

According to various embodiments, the processor 160 may drive an application based on a signal transmitted from the microphone 150. For example, when a first gesture input (e.g., an input performed by tapping the thumb and the index finger once) of the user is generated from the microphone 150, the processor 160 may move an app icon selected by a graphic object (e.g., a circular image) in a first direction. For another example, when a second gesture input (e.g., an input performed by double-tapping the thumb and the index finger) of the user is generated from the microphone 150, the processor 160 may execute an application corresponding to an app icon selected by the graphic object (e.g., the circular image).

For another example, when a third gesture input (e.g., an input performed by tapping the thumb and the middle finger once) of the user is generated from the microphone 150, the processor 160 may move an app icon selected by the graphic object (e.g., the circular image) in a second direction. For another example, when a fourth gesture input (e.g., an input performed by double-tapping the thumb and the middle finger) of the user is generated from the microphone 150, the processor 160 may terminate the running application.

Additional information on how the processor 160 drives an application based on a signal transmitted from the microphone 150 may be provided through FIGS. 10 to 13.

The strap (or fixing part, fastening part) 130 may fix the electronic device 1010 to a body part of the user. The strap 130 may include a first portion and a second portion which have fastening structures corresponding to each other. According to various embodiments, the strap 130 may be connected to the first housing 121.

Figure 2:
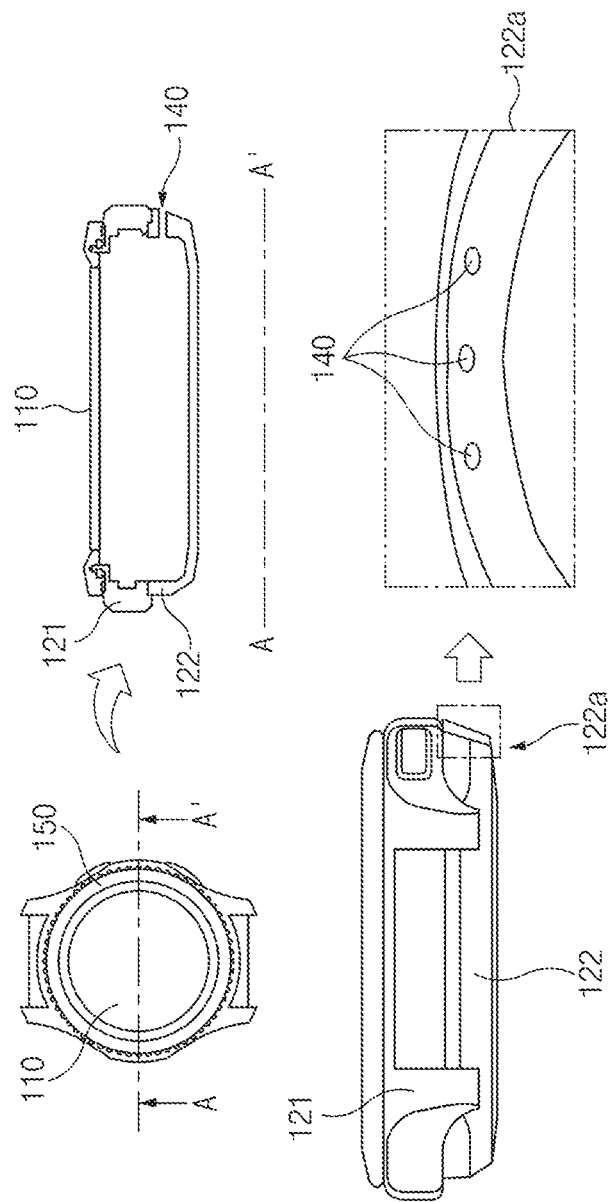
FIG. 2 is a front view, a side view, and a cross-sectional view of the wearable device according to various embodiments.

FIG. 2 is a front view, a side view, and a cross-sectional view of the wearable device according to various embodiments.

Referring to FIG. 2, in the front view, the wearable device 101 may include a display 110. The user may control the wearable device 101 by generating a touch input on the display 110. The display 110 of the wearable device 101 may be relatively small in size compared to a mobile device such as a general smartphone or a tablet PC.

According to various embodiments, the wearable device 101 may include the wheel 115 surrounding the display 110. The wheel 115 may rotate. The wheel 115 may rotate in the clockwise direction or in the counterclockwise direction. Depending on the rotation direction/rotation angle of the wheel 115, the user interface displayed on the display 110 may be changed.

In the side view, the wearable device 101 may include the first housing (or front housing, upper housing) 121 and the second housing (or back housing, lower housing) 122.

The first housing 121 may include the display 110, a physical button, a connecting structure for connection with the strap 130, and the like. The second housing 122 may include the plurality of openings 140 in the first side portion 122a. The plurality of openings 140 may transmit sound or vibration generated from the outside to the microphone 150, which is inside the wearable device 101. In an embodiment, a first side portion 122a may have an inclined surface. Through the inclined surface, a portion in which the plurality of openings 140 are disposed may protrude outward from other portions (portions adjacent to the back surface) in which the plurality of openings 140 are not disposed.

According to another embodiment, the first side portion 122a may have a step. Through the step, the portion in which the plurality of openings 140 are disposed may protrude outward from other portions (portions adjacent to the back surface) in which the plurality of openings 140 are not disposed.

According to various embodiments, the first side portion 122a in which the plurality of openings 140 are disposed may have a curved shape that is convex in the outward direction. The shape around the microphone hole of the general wearable device may be concave in the inward direction so as not to be blocked by a body part of the user. On the other hand, in the wearable device 101 according to the present disclosure, the shape may be convex in the outward direction, in order to easily recognize a gesture input using fingers of the user (e.g., an operation of contacting a plurality of fingers (e.g., tapping or hitting)). The wearable device 101 may dispose the plurality of openings 140, through which sound or vibration is allowed to be introduced, on the first side portion 122*a* of a curved shape, thereby making it possible to reduce the possibility that the plurality of openings 140 are all blocked by the body part of the user.

In the process of using the wearable device 101 worn on the wrist by the user, when the part of the hand or the wrist of the user comes into contact with the first side portion 122*a*, the plurality of openings 140 may be different from each other in a degree to which a portion of the hand or the wrist of the user covers (blocks) the openings.

According to an embodiment, the first side portion 122*a* in which the plurality of openings 140 are disposed may protrude outward from the second side portion 122*b* in which the plurality of openings 140 are not disposed. If the first side portion 122*a* protrudes outward, the vibration due to the gesture input generated by the hand of the user (e.g., the operation of contacting a plurality of fingers (e.g., tapping or hitting)) may be easily transmitted to the microphone 150 therein.

According to another embodiment, the first side portion 122*a* in which the plurality of openings 140 are disposed may have the same shape as the second side portion 122*b* in which the plurality of openings 140 are not disposed. For example, the first side portion 122*a* and the second side portion 122*b* may have a curved shape that is convex in the outward direction.

In the cross sectional view in an A-A' direction, the plurality of openings 140 may be shaped to penetrate the inside and outside of the second housing 122. The plurality of openings 140 may transmit sound or vibration generated from the outside to the microphone 150 inside the wearable device 101. The sound or vibration introduced through the plurality of openings 140 may be transmitted to the microphone 150 via a passage (or hole) formed in an inner bracket (not illustrated), an elastic body (not illustrated), a printed circuit board (not illustrated), and the like, inside the wearable device 101. Additional information regarding the passage formed in the inner bracket (not illustrated), the elastic body (not illustrated), the printed circuit board (not illustrated), and the like, may be provided through FIGS. 3 to 9.

Figure 3:
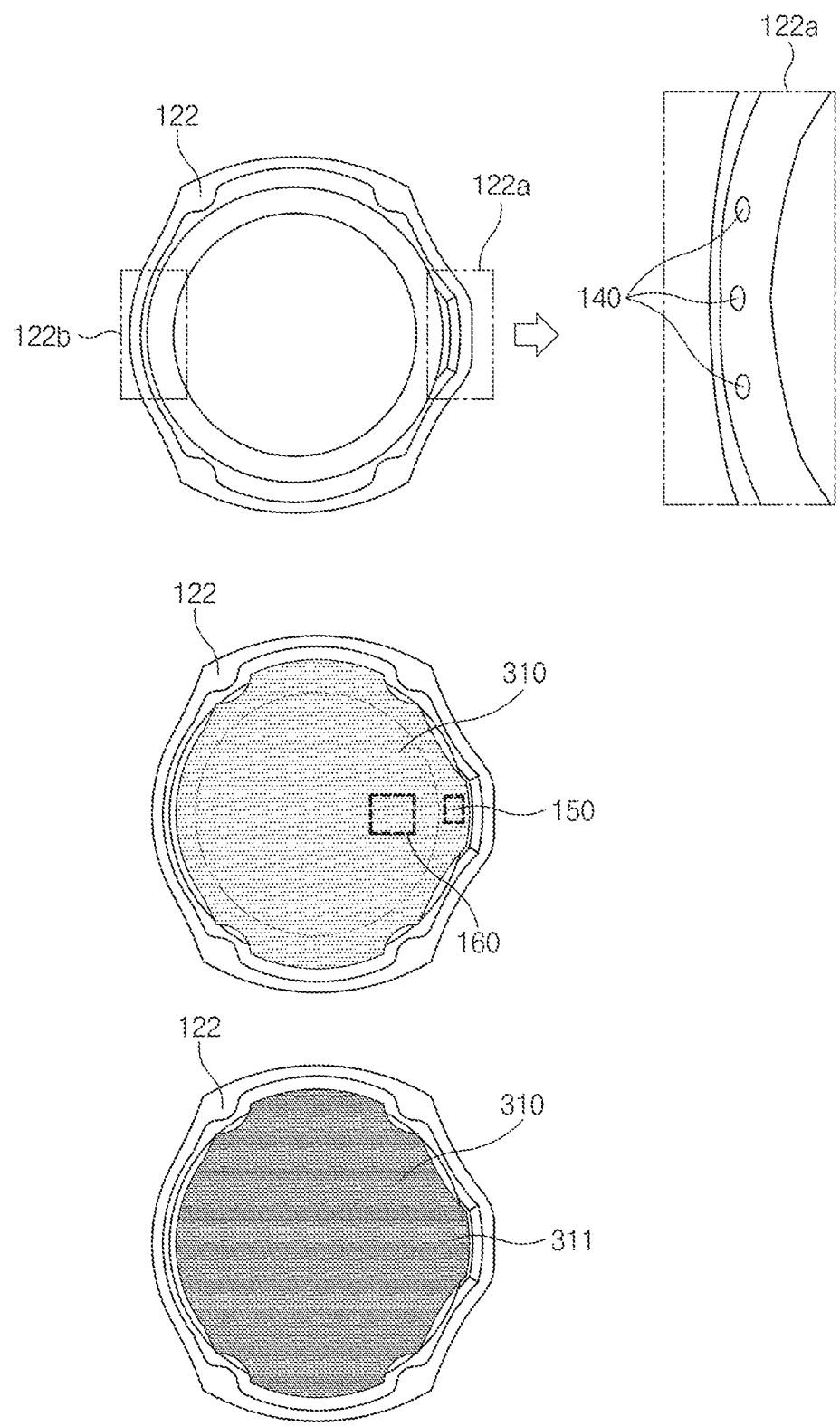
FIG. 3 illustrates a disposition of a printed circuit board inside a lower housing according to various embodiments.

FIG. 3 illustrates a disposition of a printed circuit board inside the lower housing according to various embodiments.

Referring to FIG. 3, the second housing (or lower housing, back housing) 122 according to various embodiments of the present disclosure may include the plurality of openings 140 in the first side portion 122*a*. The plurality of openings 140 may transmit sound or vibration generated from the outside to the microphone 150, which is inside the wearable device 101.

In the second housing 122, a printed circuit board 310 may be disposed. According to various embodiments, the printed circuit board 310 may be disposed such that the surface on which the chip is fixed faces the second housing 122 (such that the surface faces the back surface of the wearable device 101). The printed circuit board 310 may include various chips (a communication circuit, a processor, a memory, and so on).

According to various embodiments, the printed circuit board 310 may include the microphone 150 at a point adjacent to the first side portion 122*a*. The printed circuit board 310 may electrically connect the microphone 150 to the processor 160 via wiring.

According to various embodiments, the printed circuit board 310 may include a board hole (or passage) 311 penetrating the printed circuit board 310 at a point where the microphone 150 is fixed. The board hole 311 may transmit sound or vibration introduced through the plurality of openings 140 to the microphone 150.

The inner bracket (not illustrated) (see FIGS. 4 and 5) and the elastic body (not illustrated) (see FIGS. 5 and 6) may be separately disposed between the plurality of openings 140 and the board hole 311. The inner bracket (not illustrated) and the elastic body (not illustrated) may spatially connect the plurality of openings 140 and the board hole 311.

Figure 4:
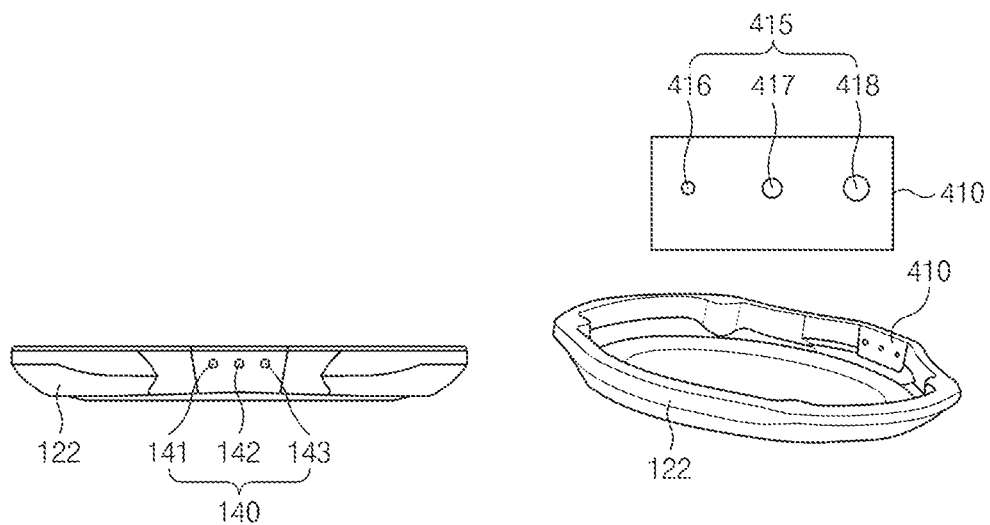
FIG. 4 illustrates an inner bracket of a second housing according to various embodiments.

FIG. 4 illustrates an inner bracket of the second housing according to various embodiments.

Referring to FIG. 4, an inner bracket 410 may be included on the inner surface of the second housing 122. For example, the inner bracket 410 may be fixed to the inner surface of the second housing 122 through a separate adhesive member (e.g., double-sided tape, or adhesive).

According to various embodiments, the inner bracket 410 may include a plurality of holes 415 corresponding to the plurality of openings 140. The inner bracket 410 may spatially connect the plurality of openings 140 formed in the second housing 122 to form a passage via which sound or vibration moves. In an embodiment, the number of the plurality of holes 415 may be the same as the number of the plurality of openings 140. For example, the first opening 141 may be disposed such that the center thereof coincides with that of a first hole 416. The second opening 142 may be disposed such that the center thereof coincides with that of a second hole 417. The third opening 143 may be disposed such that the center thereof coincides with that of a third hole 418.

According to various embodiments, the plurality of openings 140 formed in the second housing 122 may have the same size (same diameter). On the other hand, the plurality of holes 415 of the inner bracket 410 corresponding to the plurality of openings 140 may have different diameters. For example, as illustrated in FIG. 4, the first hole 416, the second hole 417, and the third hole 418 may have larger diameters in this order. For another example, unlike FIG. 4, the first hole 416, the second hole 417, and the third hole 418 may have smaller diameters in this order. In this case, if the same vibration signal is introduced into the plurality of holes 415 of the inner bracket 410, the vibration signal may have different vibration characteristics by passing through the respective holes.

According to an embodiment, the inner bracket 410 may be made of an SUS material. For example, if the inner bracket 410 is made of the SUS material, the smallest hole (e.g., the first hole 416) among the plurality of holes 415 may be formed to have a size of about 0.3 pi by an etching method. The largest hole (e.g., the third hole 418) among the plurality of holes 415 may be formed to have a size of about 1.0 pi or less.

According to an embodiment, the inner bracket 410 may be coated with a color similar to the lower housing 122 so as not to be viewed from the outside through the plurality of openings 140.

Figure 5:
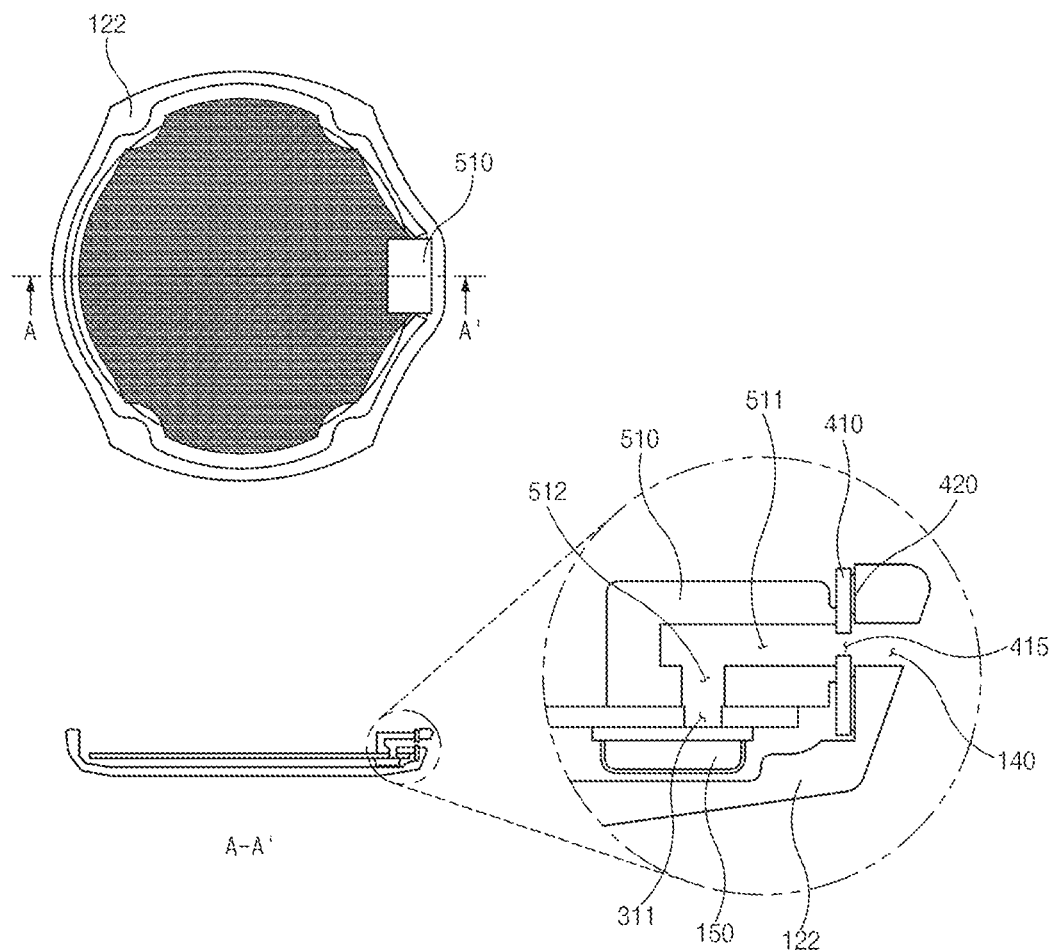
FIG. 5 illustrates a wearable device including an elastic body according to various embodiments.

FIG. 5 illustrates a wearable device including an elastic body according to various embodiments.

Referring to FIG. 5, the printed circuit board 310 may be included inside the lower housing 122. The printed circuit board 310 may include the microphone 150 on the first surface. The printed circuit board 310 may be disposed such that the first surface on which the microphone 150 is fixed faces the lower housing 122. The printed circuit board 310 may include the board hole 311 penetrating the first surface (the front surface of the printed circuit board 310, where the chip is fixed) and the second surface (the back surface of the printed circuit board 310). The board hole 311 may be spatially connected to a passage formed inside an elastic body 510.

The elastic body 510 may be disposed to contact the second surface of the printed circuit board 310 (the back surface of the printed circuit board 310). The elastic body 510 may include a first passage 511 and a second passage 512 spatially connecting the plurality of openings 140 formed therein (or the plurality of holes 415 formed in the inner bracket 410) and the board hole 311 of the printed circuit board 310. The first passage 511 may be formed in a first direction (direction parallel to the display surface), and the second passage 512 may be formed in a second direction perpendicular to the first direction.

The inner bracket 410 may be disposed between the elastic body 510 and the plurality of openings 140. The inner bracket 410 may include the plurality of holes 415 corresponding to the plurality of openings 140. The inner bracket 410 may be fixed to the inner surface of the second housing 122 through an adhesive member 420 (e.g., double-sided tape, adhesive).

According to various embodiments, a waterproof film (e.g., a Gore-Tex film) may be disposed between the inner bracket 410 and the inner surface of the second housing 122. The waterproof film (e.g., Gore-Tex film) may prevent moisture from entering the inside of the second housing 122 through the plurality of openings 140.

A sound or vibration signal generated from the outside may pass through the plurality of openings 140. The sound or vibration signal may be primarily filtered through the plurality of holes 415 formed in the inner bracket 410. For example, the sound or vibration signal introduced through the hole of the smallest size among the plurality of holes 415 may be greatly weakened in signal intensity. The sound or vibration signal introduced through a hole of the largest size among the plurality of holes 415 may be maintained in signal intensity.

The sound or vibration signal passing through the plurality of holes 415 may be transmitted to the microphone 150 via the first passage 511 and the second passage 512 of the elastic body 510, and the board hole 311.

According to various embodiments, at least a portion of the microphone 150 may be accommodated in the elastic body 510. For example, the elastic body 510 may include an additional elastic portion (not illustrated) that covers the microphone 150. An additional elastic portion (not illustrated) may protect the microphone 150 from external impacts, and may physically or electrically separate the surrounding parts from the microphone 150.

For another example, the microphone 150 may be disposed toward the surface of the printed circuit board 310 facing the elastic body 510. A portion of the microphone 150 may be accommodated inside the elastic body 510.

Figure 6:
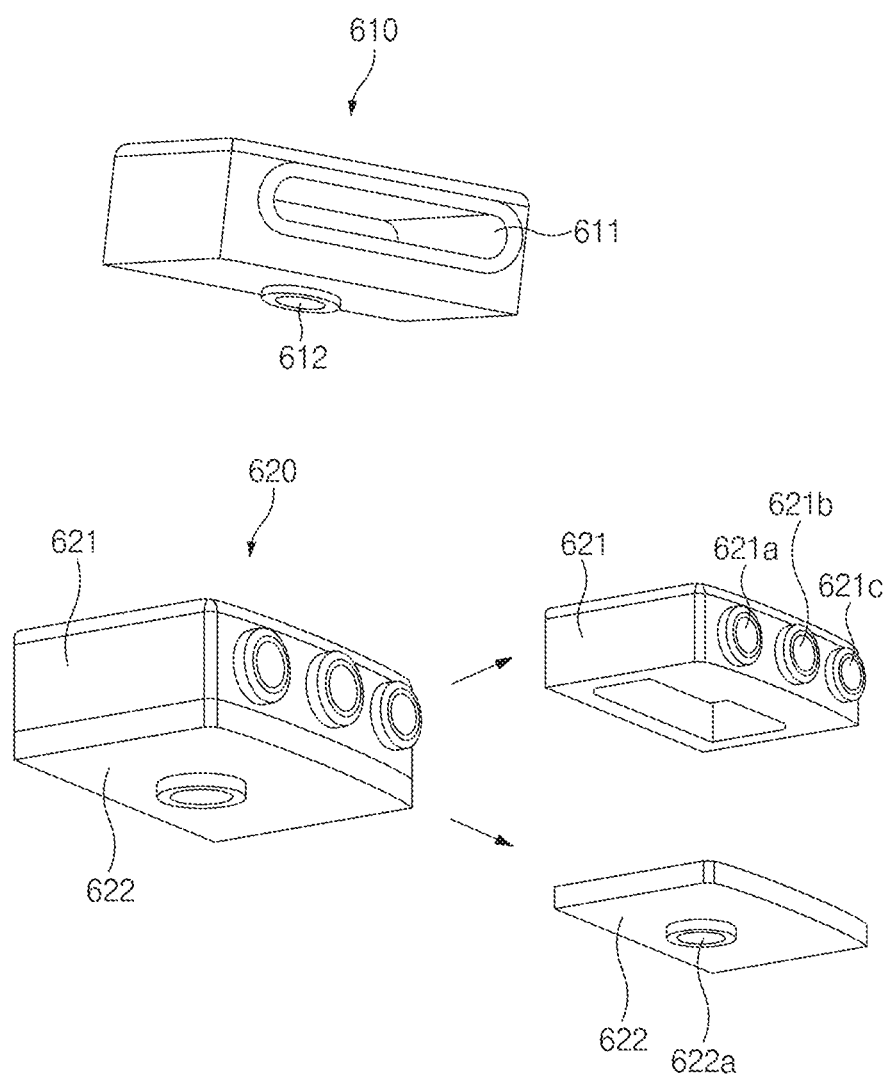
FIG. 6 illustrates a shape of the elastic body according to various embodiments.

FIG. 6 illustrates a shape of the elastic body according to various embodiments.

Referring to FIG. 6, an elastic body 610 may be formed of one piece. The elastic body 610 may be formed by a single injection process. The elastic body 610 may be used if the plurality of openings 140 are disposed to be adjacent to each other.

The elastic body 610 may include a first passage 611 and a second passage 612 therein. The first passage 611 may be formed in a first direction (direction parallel to the display surface), and the second passage 612 may be formed in a second direction perpendicular to the first direction. According to an embodiment, the first passage 611 may integrally transmit the sound or vibration signal introduced to the plurality of openings 140 of the lower housing 122 without separation.

The elastic body 620 may be formed of a first piece 621 and a second piece 622. The first piece 621 and the second piece 622 may each be formed by a plurality of injection processes. According to an embodiment, the elastic body 620 may be used if the plurality of openings 140 of the lower housing 122 are disposed apart from each other by a predetermined distance or more.

The first piece 621 may include a plurality of first passages 621a, 621b, and 621c. The plurality of first passages 621a, 621b, and 621c may be formed in the first direction (direction parallel to the display surface). The plurality of first passages 621a, 621b, and 621c may transmit the sound or vibration signal introduced into the plurality of openings 140 with being separated for a predetermined distance.

The second piece 622 may include a second passage 622. The second passage 622 may be formed in a second direction perpendicular to the first direction. The second passage 622 may integrally transmit the sound or vibration signal that has passed through the plurality of first passages 621a, 621b, and 621c without separation.

According to various embodiments, the elastic body 610 and the elastic body 620 may be formed of materials such as rubber and urethane.

Figure 7:
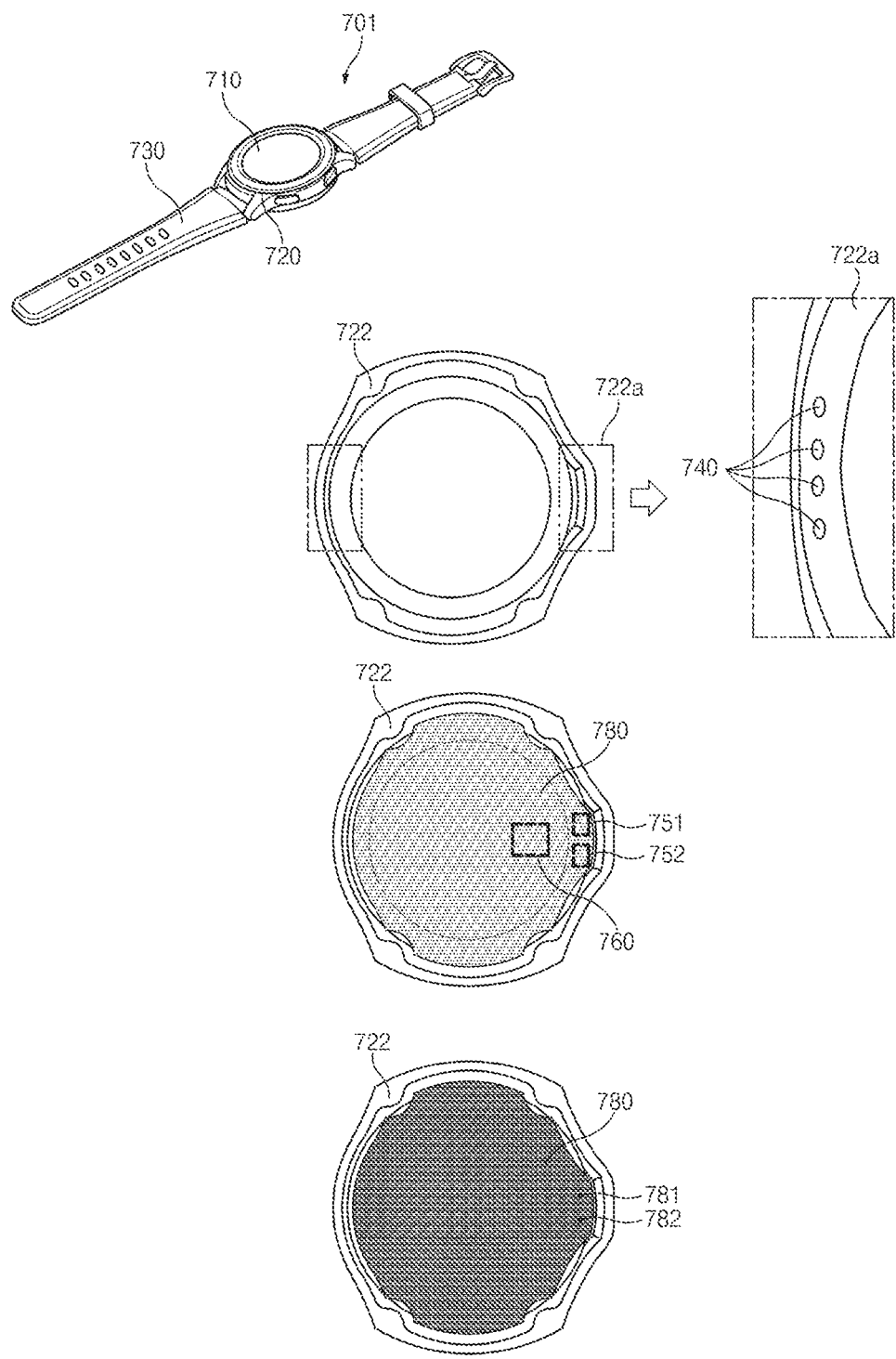
FIG. 7 illustrates an electronic device including a plurality of microphones according to various embodiments.

FIG. 7 illustrates an electronic device including a plurality of microphones according to various embodiments.

Referring to FIG. 7, an electronic device 701 may include a plurality of openings 740 in a second housing 722. In FIG. 7, a case is exemplarily illustrated in which the number of the plurality of openings 740 is four; however, the present disclosure is not limited thereto.

The plurality of openings 740 may transmit sound or vibration generated from the outside to a plurality of microphones 751 and 752 inside the electronic device 701.

In the second housing 722, a printed circuit board 780 may be disposed. The printed circuit board 780 may be disposed such that the surface on which the chip is fixed faces the second housing 722 (such that the surface faces the back surface of the electronic device 701). The printed circuit board 780 may include various chips (a communication circuit, a processor, a memory, and so on).

According to various embodiments, the printed circuit board 310 may include the first microphone 751 and the second microphone 752 at a point adjacent to the first side portion 122a. The printed circuit board 780 may electrically connect the first microphone 751 and the second microphone 752 to the processor 760 via wiring.

According to various embodiments, the printed circuit board 780 may include a first board hole (or passage) 781 penetrating the printed circuit board 780 at a point where the first microphone 751 is fixed. In addition, the printed circuit board 780 may include a second board hole (or passage) 782 penetrating the printed circuit board 780 at a point where the second microphone 752 is fixed. The first board hole (or passage) 781 and the second board hole (or passage) 782 may transmit sound or vibration introduced through the plurality of openings 740 to the first microphone 751 and the second microphone 752, respectively.

The inner bracket (not illustrated) and the elastic body (not illustrated) (see FIGS. 8 and 9) may be separately disposed between the plurality of openings 740 and the board holes 781 and 782. The inner bracket (not illustrated)

and the elastic body (not illustrated) may spatially connect the plurality of openings 740 and the board holes 781 and 782.

Figure 8:
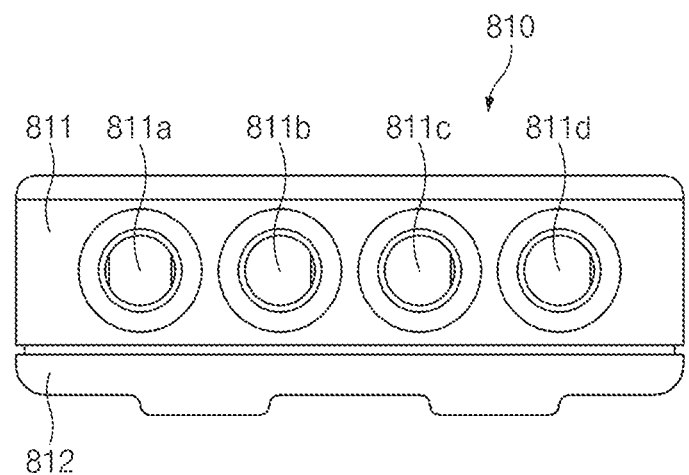
FIG. 8 is an elastic body providing passages to the plurality of microphones according to various embodiments.
Figure 8:
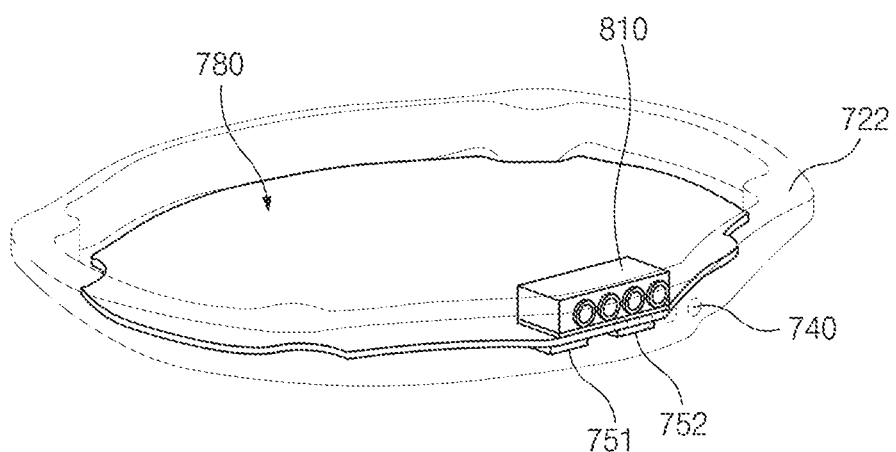

FIG. 8 illustrates an elastic body providing passages to the plurality of microphones according to various embodiments. FIG. 8 is exemplary and is not limited thereto.

Referring to FIG. 8, an elastic body 810 may be disposed to contact the second surface of the printed circuit board 780 (the back surface of the printed circuit board 780). The elastic body 810 may include first passages 811a to 811d and second passages 812a to 812d spatially connecting the plurality of openings 740 formed therein and the board holes 781 and 782 of the printed circuit board 780. The first passages 811a to 811d may be formed in a first direction (direction parallel to the display surface), and the second passages 812a to 812b may be formed in a second direction perpendicular to the first direction.

According to various embodiments, a separate inner bracket (not illustrated) may be inserted between the elastic body 810 and the second housing 722. The inner bracket may include a plurality of holes corresponding to the plurality of openings 740. The inner bracket may be fixed to the inner surface of the second housing 722 through the adhesive member 420 (e.g., double-sided tape, adhesive).

According to various embodiments, the elastic body 810 may be formed of the first piece 811 and the second piece 812. Additional information regarding the first piece 811 and the second piece 812 may be provided through FIG. 9.

Figure 9:
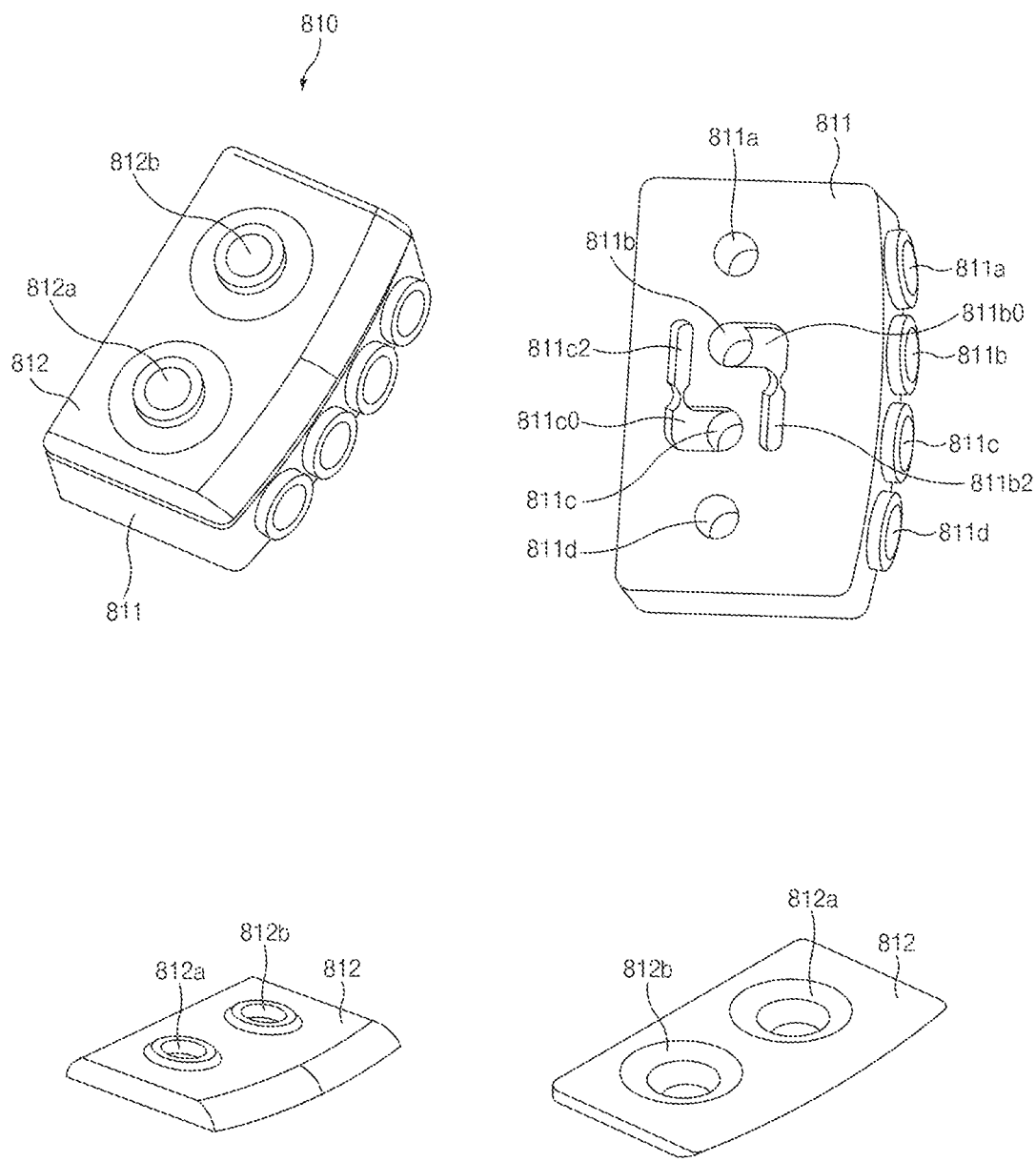
FIG. 9 illustrates the elastic body providing passages to the plurality of microphones according to various embodiments.

FIG. 9 illustrates an inner structure of the elastic body providing passages to the plurality of microphones according to various embodiments.

Referring to FIG. 9, the elastic body 810 may be formed by combining the first piece 811 and the second piece 812. The first piece 811 and the second piece 812 may be formed by different injection processes. According to an embodiment, the elastic body 810 may be used if the plurality of openings 740 of the lower housing 722 are disposed apart from each other by a predetermined distance or more.

The first piece 811 may include the plurality of first passages 811a to 811d. The plurality of first passages 811a to 811d may be formed in the first direction (direction parallel to the display surface). The plurality of first passages 811a to 811d may transmit the sound or vibration signal introduced into the plurality of openings 740 with being separated for a predetermined distance. The first piece 811 may include the same number of first passages 811a to 811d as the number of the plurality of openings 740.

According to various embodiments, the first piece 811 may include acoustic spaces 811b0 and 811c0 on a surface adjacent to the second piece 812. Some passages 811b and 811c among the plurality of first passages 811a to 811d may be spatially connected to the acoustic spaces 811b0 and 811c0 formed between the first piece 811 and the second piece 812. The acoustic spaces 811b0 and 811c0 may cause the sound or vibration signal introduced through some passages 811b and 811c to be lost, thereby generating a difference from the signal passing through some other passages 811a and 811d.

According to various embodiments, the first piece 811 may include additional acoustic spaces 811b2 and 811c2 on a surface adjacent to the second piece 812. The acoustic spaces 811b0 and 811c0 may be spatially connected to the additional acoustic spaces 811b2 and 811c2. The additional acoustic spaces 811b2 and 811c2 may increase the loss ratio of the signal introduced through some passages 811b and 811c.

In FIG. 9, a case is exemplarily illustrated in which the acoustic spaces 811b0 and 811c0 and the additional acoustic spaces 811b2 and 811c2 of the same shape are formed in some passages 811b and 811c; however, the present disclosure is not limited thereto. For example, an acoustic space and an additional acoustic space may be formed in some other passages 811a and 811d. In addition, the shapes of the acoustic spaces 811b0 and 811c0 and the additional acoustic spaces 811b2 and 811c2 may be variously modified.

The second piece 812 may include the plurality of second passages 812a and 812b. The plurality of second passages 812a and 812b may be formed in the second direction perpendicular to the first direction. The plurality of second passages 812a and 812b may transmit the sound or vibration signal that has passed through the plurality of first passages 811a to 811d to each of the plurality of microphones 751 and 752. The second piece 812 may include the plurality of second passages 812a and 812b, the number of which is equal to the number of the microphones 751 and 752.

Figure 10A:
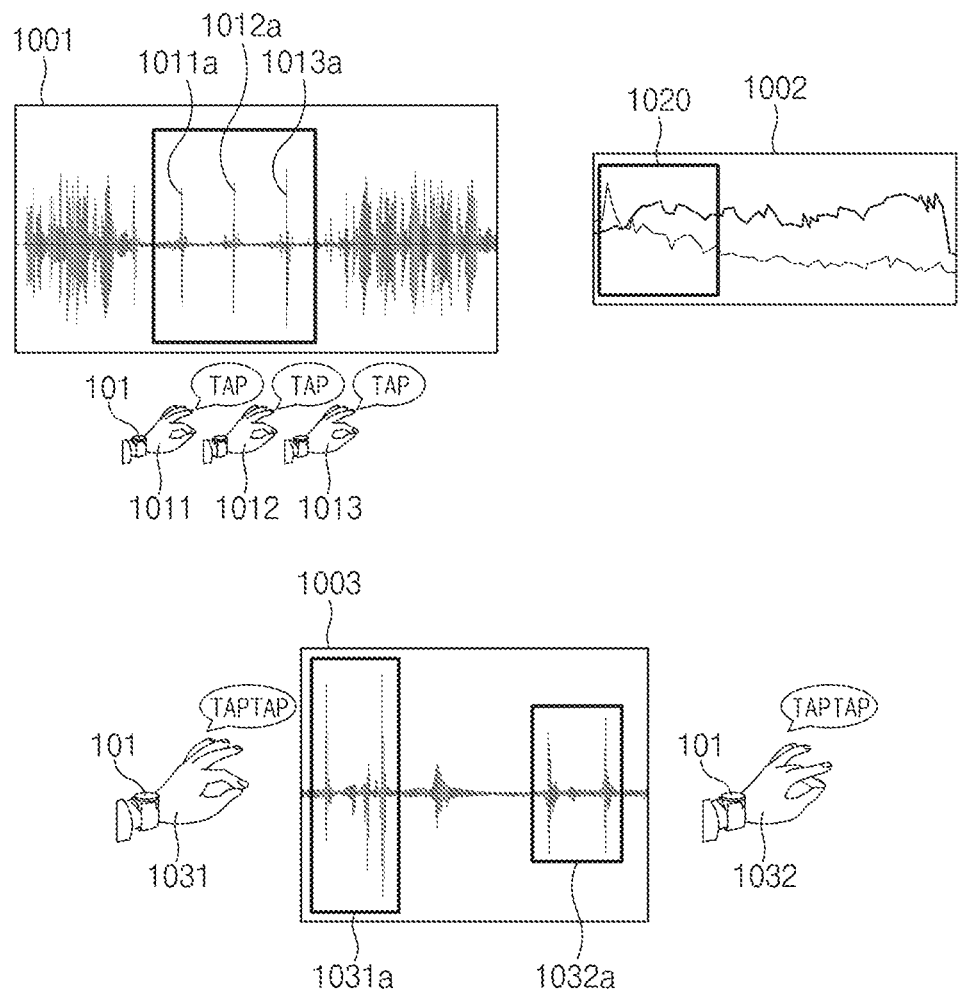
FIG. 10a illustrates characteristics of gesture inputs using fingers according to various embodiments.

FIG. 10a illustrates characteristics of gesture inputs using fingers according to various embodiments.

Referring to FIG. 10a, the processor 160 may analyze a tap input (an input performed by hitting two fingers) of the user transmitted through the plurality of openings 140 to determine the type of the tap input. The processor 160 may execute a corresponding function in an application in response to the determined tap input.

A first graph 1001 represents a change in intensity of the sound or vibration signal introduced into the microphone 150 as the user wears the wearable device 101 on the wrist, raises the hand, and generates a tap input (hereinafter, a first type tap input) performed by hitting the thumb and index finger once (1011 to 1013). The first type tap input may be generated in a state in which at least some of the plurality of openings 140 are blocked by a portion of the back of the hand of the user (contacting state).

In the first graph 1001, electrical signals 1011a, 1012a, and 1031a that are distinguishable from general noise signals may be generated by the first type tap inputs 1011, 1012, and 1013.

A second graph 1002 represents the frequency characteristics of the first type tap inputs 1011, 1012, and 1013. In the second graph 1002, the first type tap inputs 1011, 1012, and 1013 may have the highest values in a low frequency band 1020 that is not affected by the actual environmental noise. The processor 160 may use the electrical signals 1011a, 1012a, and 1031a to determine the type of tap input generated by the user using fingers.

The first graph 1001 and the second graph 1002 exemplarily illustrate the first type tap inputs 1011, 1012, and 1013 by way of example; however, the present disclosure is not limited thereto. For example, the processor 160 may recognize a tap input (hereinafter a second type tap input) in which the user wears the wearable device 101 on the wrist, raises the hand, and hits the thumb and the middle finger once.

A third graph 1003 represents a signal difference between a case in which the user generates a tap input (hereinafter a first type double-tap input) 1031 performed by wearing the wearable device 101 on the wrist, raising the hand, and hitting the thumb and the index finger twice, and a case in which the user generates a tap input (hereinafter a second type double-tap input) 1032 performed by hitting the thumb and the middle finger twice.

The first type double tap input 1031 may correspond to an electrical signal 1031a in a first section, and the second type double-tap input 1032 may correspond to an electrical signal 1032a in a second section. The first type double-tap input 1031 may be generated at a position closer to the wearable device 101 than the second type double-tap input 1032, and thus the signal intensity may be greater than or equal to a specified value. The second type double-tap input 1032 may be generated at a position farther from the wearable device 101 than the first type double tap input 1031, and thus the signal intensity may be less than or equal to a specified value.

The processor 160 may store intensity and frequency characteristics, and the like, corresponding to each input characteristic in advance, and determine a type of tap input when the user hits fingers. The processor 160 may execute a corresponding function in an application in response to the determined tap input (see FIGS. 11 to 13).

Figure 10B:
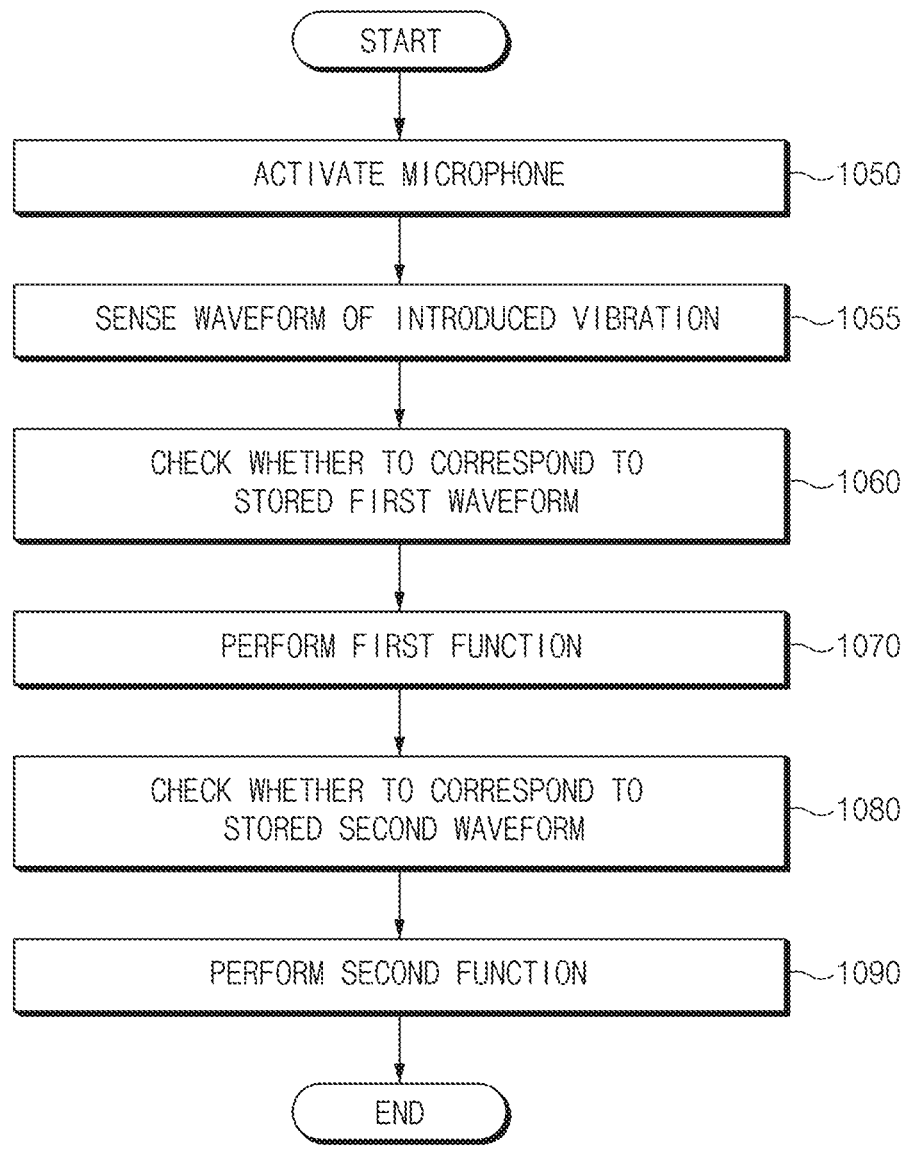
FIG. 10b is a flowchart illustrating an application execution method according to various embodiments.

FIG. 10b is a flowchart illustrating an application execution method according to various embodiments.

Referring to FIG. 10b, in operation 1050, the processor 160 of the wearable device 101 may activate the microphone 150.

In operation 1055, the processor 160 may sense a waveform of vibration introduced from the outside through the microphone 150.

In operation 1060, the processor 160 may check whether or not the waveform of the introduced vibration corresponds to a first waveform stored in the memory of the wearable device 101.

In operation 1070, the processor 160 may perform a preset first function if the waveform of the introduced vibration corresponds to the first waveform.

For example, in a state in which one of the icons of the applications is selected, when the first type double-tap input is generated, the processor 160 may execute an application corresponding to the selected icon. For another example, in a state in which one of the icons of applications is selected, when the first type tap input is generated, another icon disposed after the selected icon may be selected.

According to various embodiments, the processor 160 may move at least one graphic object displayed on the display 110 in the first direction, in response to the first gesture input (e.g., the first type tap input). For example, the processor 160 may allow an application, which is disposed counterclockwise with respect to the application selected by the graphic object displayed on the display 110, to be selected by the graphic object, in response to the first type tap input.

According to an embodiment, when the first gesture input is generated multiple times (e.g., twice) within a specified time (e.g., when the first type double-tap input is generated), the processor 160 may perform the operation corresponding to the at least graphic object displayed on the display 110. The processor 160 may execute an application selected by the graphic object displayed on the display 110 in response to the first type double-tap input. For example, the processor 160 may allow an application, which is disposed clockwise with respect to the application selected by the graphic object displayed on the display 110, to be selected by the graphic object.

In operation 1080, the processor 160 may check whether or not the waveform of the vibration introduced from the outside corresponds to the second waveform stored in the memory of the wearable device 101. According to various embodiments, operation 1080 may be performed simultaneously with operation 1060.

In operation 1090, the processor 160 may perform a preset second function if the waveform of the introduced vibration corresponds to the stored second waveform. According to various embodiments, operation 1070 or operation 1090 may not be performed according to the check result of operation 1080 or operation 1090.

For example, in a state in which the application is running, when a second type double-tap input is generated, the processor 160 may terminate the running application. The application corresponding to the selected icon may be executed. For another example, in a state in which one of the icons of the application is selected, when a second type tap input is generated, another icon disposed before the selected icon may be selected.

According to various embodiments, the processor 160 may move the at least one graphic object displayed on the display 110 in the second direction, in response to the second gesture input. For example, the processor 160 may allow an application, which is disposed counterclockwise with respect to the application selected by the graphic object displayed on the display 110, to be selected by the graphic object, in response to the second type tap input.

According to an embodiment, when the second gesture input is generated a plurality of times (e.g., twice) within a specified time (e.g., about 0.5 seconds), the processor 160 may be configured to refrain from performing the operation corresponding to at least one graphic object. For example, the processor 160 may stop executing an application selected by the graphic object displayed on the display 110 in response to the second type double-tap input.

Figure 11:
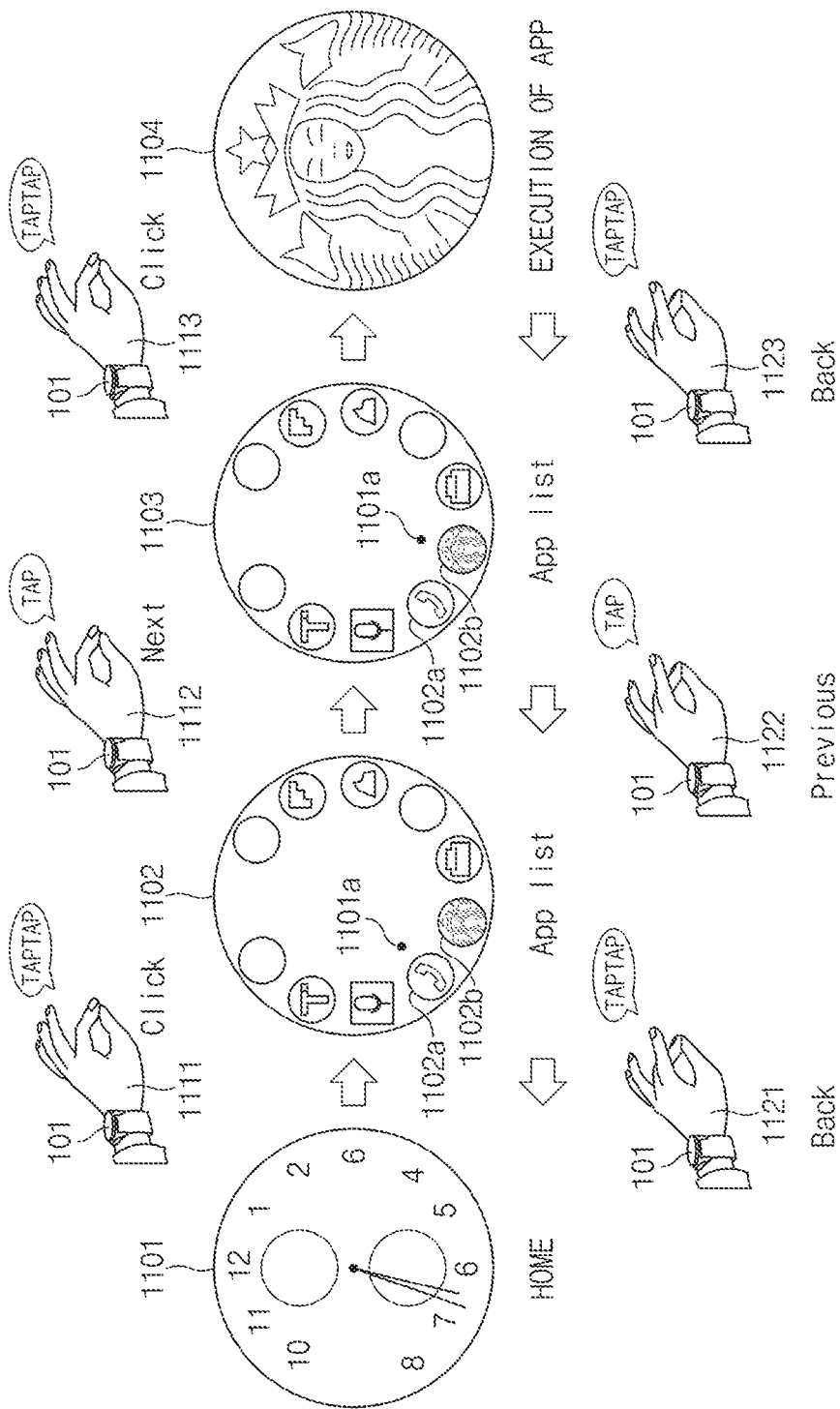
FIG. 11 is an exemplary screen diagram illustrating execution of an application on a home screen according to various embodiments.

FIG. 11 is an exemplary screen diagram illustrating execution of an application on a home screen according to various embodiments.

Referring to FIG. 11, the user may wear the wearable device 101 on the wrist and may generate a specified gesture input (e.g., tap input performed by tapping two fingers) using fingers, thereby making it possible to control the wearable device 101 with one hand.

According to various embodiments, when a first type double-tap input 1111 is generated on a home screen 1101, the processor 160 may display an application list 1102.

If the user terminates the application list 1102 and tries to return to the previous home screen 1101, a second type double-tap input 1121 may be generated. The processor 160 may terminate the application list 1102 and display the home screen 1101 in response to the second type double-tap input 1121.

According to various embodiments, in the application list 1102, when a first type tap input 1112 is generated, the processor 160 may select, by the graphic object 1101a, a second icon 1102b (e.g., Starbucks app icon), which is disposed after a first icon 1102a (e.g., call app icon) currently selected by the graphic object 1101a (1103).

Conversely, when a second type tap input 1122 is generated, the processor 160 may select, by the graphic object 1101a, the first icon 1102a (e.g., call app icon), which is disposed before the second icon 1102b (e.g., Starbucks app icon) currently selected by the graphic object 1101a.

According to various embodiments, in a state in which one icon (e.g., the second icon 1102b) in the application list 1102 is selected by the graphic object 1101a, when a first type double-tap input 1113 is generated, the processor 160 may execute an application (e.g., Starbucks app) corresponding to the icon selected by the graphic object 1101a (1104).

Conversely, when a second type double-tap input 1123 using the thumb and the middle finger is generated, the processor 160 may terminate the currently running application (e.g., Starbucks app) and may return to the previous screen.

Figure 12:
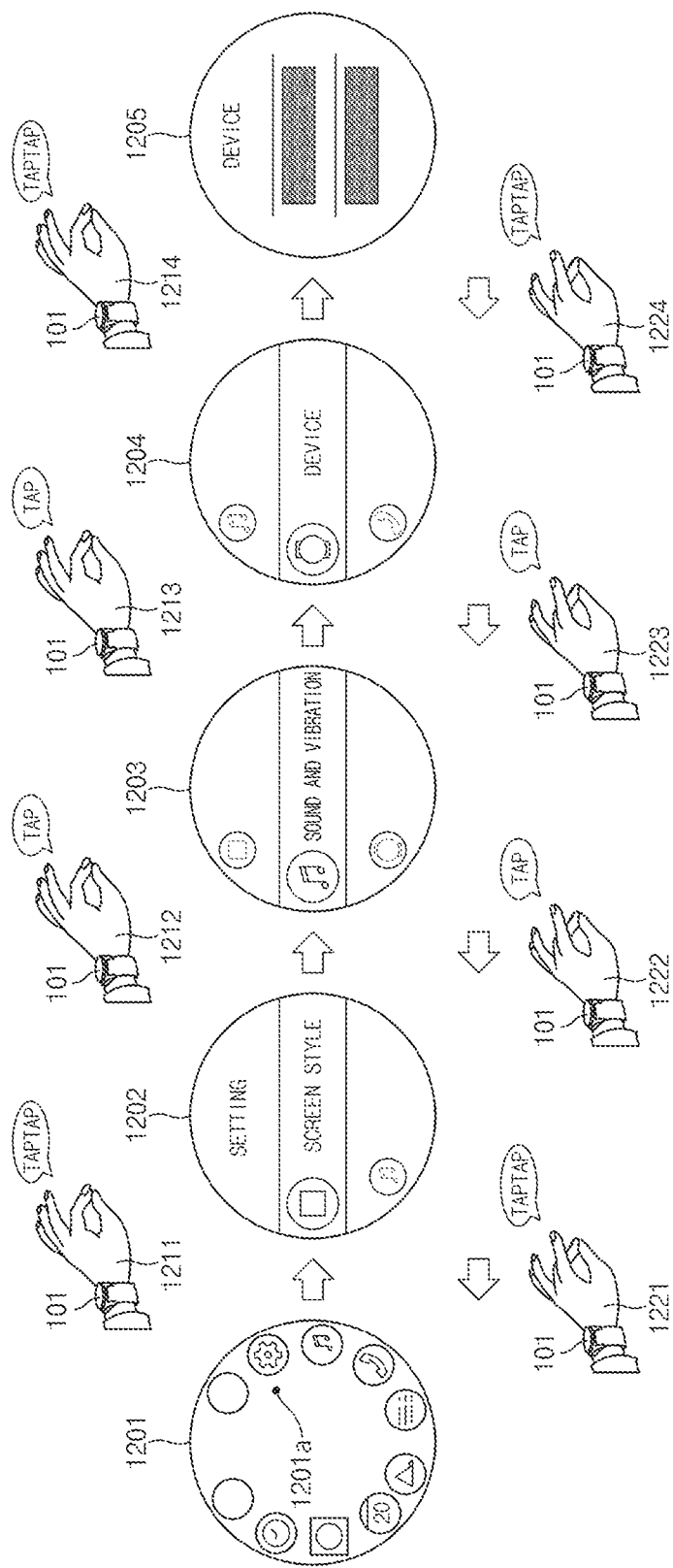
FIG. 12 is an exemplary diagram illustrating selection of an item within an application according to various embodiments.

FIG. 12 is an exemplary diagram illustrating selection of an item within an application according to various embodiments.

Referring to FIG. 12, in a state in which one icon (e.g., setting app icon) in the application list 1201 is selected by the graphic object 1201*a*, when a first type double-tap input 1211 is generated, the processor 160 may execute an application (e.g., setting app) corresponding to the icon selected by the graphic object 1201*a* (1202).

When a second type double-tap input 1221 is generated, the processor 160 may terminate the currently running application (e.g., setting app) and return to the application list 1201 (1201).

According to various embodiments, if the various item lists (or selection list) are included in the executed application, the processor 160 may change or execute the selected item in response to a gesture input using the fingers of the user.

For example, in a state in which a first item (e.g., screen style setting) is selected from an item list 1202 of the setting app, when a first type tap input 1212 is generated, the processor 160 may select a second item (e.g., sound and vibration setting) after the selected icon (1203).

In a state in which the second item (e.g., sound and vibration setting) is selected, when a first type tap input 1213 is generated one more time, the processor 160 may select a third item (e.g., device setting) after the selected icon (1204).

In a state in which the second item (e.g., sound and vibration setting) is selected, when a second type tap input 1222 is generated, the processor 160 may select the first item (e.g., screen style setting) before the selected icon (1202).

In a state in which the third item (e.g., device setting) is selected, when a first type double-tap input 1214 is generated one more time, the processor 160 may display the user interface corresponding to the selected third item (e.g., device setting) (1205).

In a state in which the user interface corresponding to the third item (e.g., device setting) is displayed, when the user generates a second type double-tap input 1224, the processor 160 may display a state in which the third item (e.g., device setting) is selected (1204).

Figure 13:
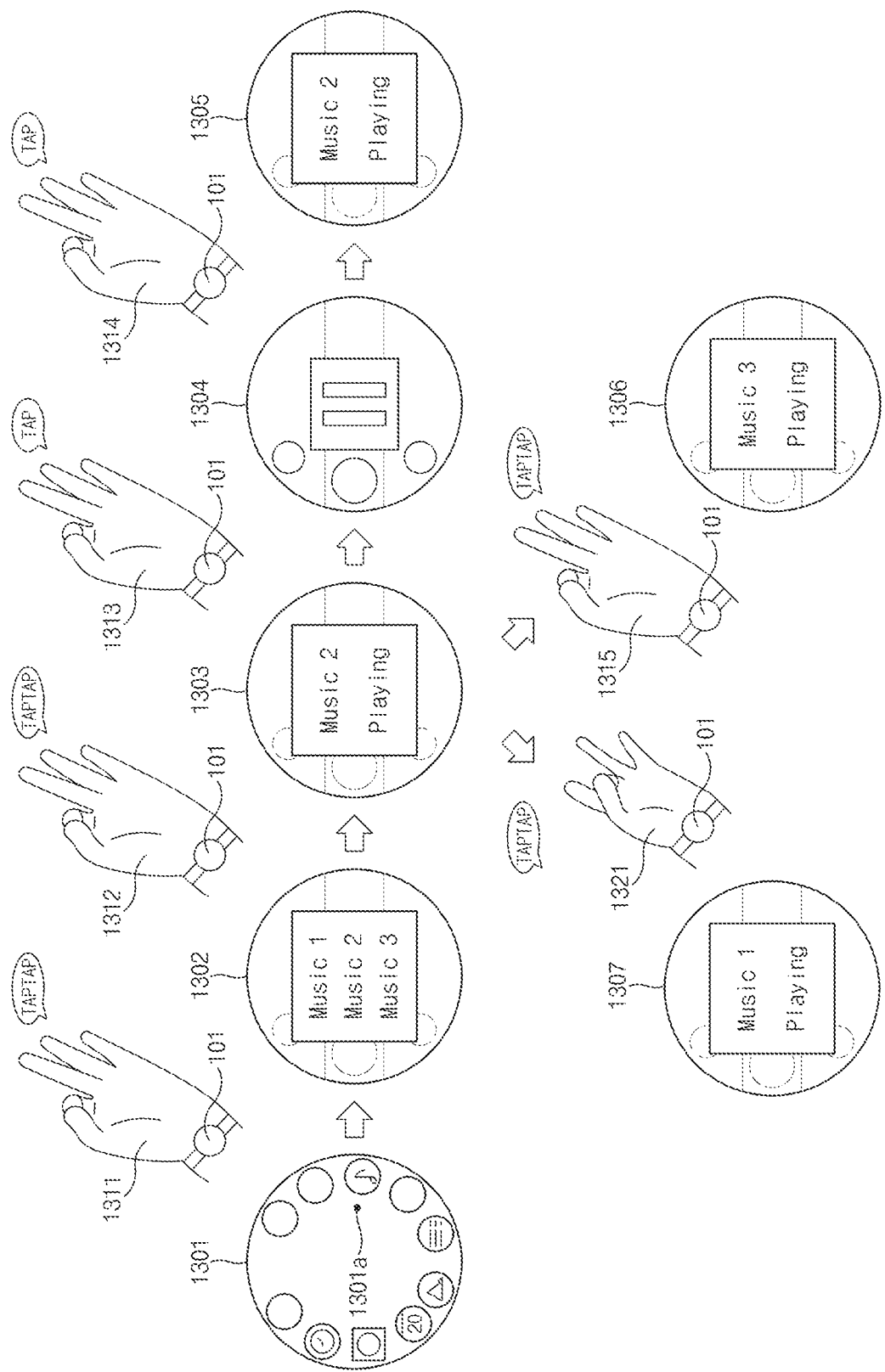
FIG. 13 is an exemplary screen diagram for music play according to various embodiments.

FIG. 13 is an exemplary screen diagram for music play according to various embodiments. FIG. 13 is exemplary and is not limited thereto.

Referring to FIG. 13, the user may wear a body part of the wearable device 101 on the inner side of the wrist and generate a gesture input using fingers. A body part under the palm of the user may be in contact with the plurality of openings, and sound or vibration may be transmitted through the plurality of openings.

In a state in which a music app icon in the application list 1201 is selected by a graphic object 1301*a* (1031), when a first type double-tap input 1311 is generated, the processor 160 may execute a music app (1302).

According to various embodiments, the processor 160 may change or playa piece of music selected in a music list in response to a gesture input using the fingers of the user.

For example, in a state in which the second piece of music is selected in the music list 1302, when a first type double-tap input 1312 is generated, the processor 160 may play the selected second music (1303).

In a state in which the second music is being played, when a first type tap input 1313 is generated, the processor 160 may pause the second music being played (1304).

In a state in which the second music is paused, when a first type tap input 1314 is generated, the processor 160 may play the second music again (1305).

According to various embodiments, in a state in which the second music is being played, when the user generates a first type double-tap input 1315, the processor 160 may play a third piece of music, which is the next piece of music (1306).

According to various embodiments, if the user generates the second type double-tap input 1321 while the second music is being played, the processor 160 may play the first piece of music, which is the previous piece of music (1307).

Figure 14:
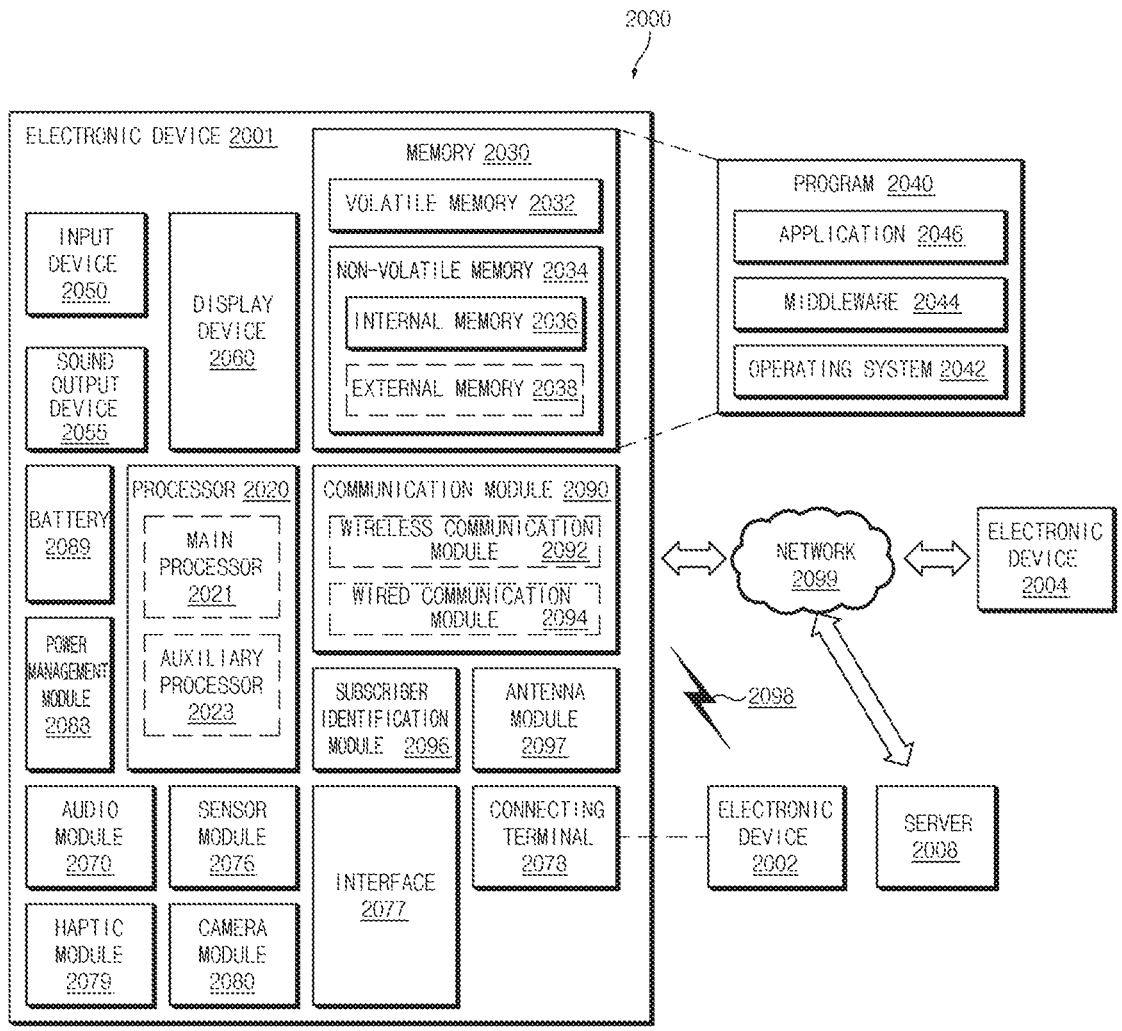
FIG. 14 is a block diagram of an electronic device in a network environment according to various embodiments.

FIG. 14 is a block diagram of a wearable device 2001 in a network environment 2000 according to various embodiments.

Referring to FIG. 14, the wearable device 2001 (e.g., the wearable device 101 of FIG. 1) in the network environment 2000 may communicate with an electronic device 2002 via a first network 2098 (e.g., a short-range wireless), or an electronic device 2004 or a server 2008 via a second network 2099 (e.g., a long-range wireless communication). According to an embodiment, the wearable device 2001 may communicate with the electronic device 2004 via the server 2008. According to an embodiment, the wearable device 2001 may include a processor 2020 (e.g., the processor 160 of FIG. 1), a memory 2030, an input device 2050, a sound output device 2055, a display device 2060 (e.g., the display 110), an audio module 2070, a sensor module 2076, an interface 2077, a haptic module 2079, a camera module 2080, a power management module 2088, a battery 2089, a communication module 2090, a subscriber identification module (SIM) 2096, and an antenna module 2097. In some embodiments, at least one (e.g., the display device 2060 or the camera module 2080) of the components may be omitted from the wearable device 2001, or other components may be added in the wearable device 2001. In some embodiments, some of the components may be implemented as single integrated circuitry. For example, the sensor module 2076 (e.g., a fingerprint sensor, an iris sensor, or an illuminance sensor) may be implemented as embedded in the display device 2060 (e.g., a display).

The processor 2020 may drive, for example, software (e.g., a program 2040) to control at least one other component (e.g., a hardware or software component) of the wearable device 2001 coupled with the processor 2020, and may perform various data processing and computation. The processor 2020 may load a command or data received from another component (e.g., the sensor module 2076 or the communication module 2090) in a volatile memory 2032 to process the command or the data, and store resulting data in a non-volatile memory 2034. According to an embodiment, the processor 2020 may include a main processor 2021 (e.g., a central processing unit (CPU) or an application processor (AP)), and an auxiliary processor 2023 (e.g., a graphics processing unit (GPU), an image signal processor (ISP), a sensor hub processor, or a communication processor (CP)) that is operable independently from the main processor 2021, and additionally or alternatively, consume less power than the main processor 2021, or is specific to a specified function. Here, the auxiliary processor 2023 may be operated as being separate from or embedded into the main processor 2021.

In this case, the auxiliary processor 2023 may control at least some of functions or states related to at least one component (e.g., the display device 2060, the sensor module 2076, or the communication module 2090) among the components of the wearable device 2001, instead of the main processor 2021 while the main processor 2021 is in an inactive (e.g., sleep) state, or together with the main processor 2021 while the main processor 2021 is in an active state (e.g., executing an application). According to an embodiment, the auxiliary processor 2023 (e.g., an image signal processor or a communication processor) may be implemented as part of another component (e.g., the camera module 2080 or the communication module 2090) functionally related to the auxiliary processor 123. The memory 2030 may store various data used by at least one component (e.g., the processor 2020 or the sensor module 2076) of the wearable device 2001. The various data may include, for example, software (e.g., the program 2040) and input data or output data for a command related thereto. The memory 2030 may include the volatile memory 2032 or the non-volatile memory 2034.

The program 2040 may be software stored in the memory 2030, and may include, for example, an operating system (OS) 2042, middleware 2044, or an application 2046.

The input device 2050 may receive a command or data to be used by components (e.g., the processor 2020) of the wearable device 2001, from the outside (e.g., a user) of the wearable device 2001. The input device 2050 may include, for example, a microphone (the microphone 150 of FIG. 1), a mouse, or a keyboard.

The sound output device 2055 may output sound signals to the outside of the wearable device 2001. The sound output device 2055 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 2060 (e.g., the display 110 of FIG. 1) may visually provide information to a user of the wearable device 2001. The display device 2060 may include, for example, a display, a hologram device, or a projector and control circuitry to control a corresponding one of the display, hologram device, and projector. According to an embodiment, the display device 2060 may include touch circuitry or pressure circuitry adapted to measure the intensity of pressure on the touch.

The audio module 2070 may convert a sound into an electrical signal and vice versa. According to an embodiment, the audio module 2070 may obtain the sound via the input device 2050, or output the sound via the sound output device 2055 or an external electronic device (e.g., an electronic device 2002) (e.g., a speaker or a headphone) wiredly or wirelessly coupled with the wearable device 2001.

The sensor module 2076 may generate an electrical signal or data value corresponding to an internal operational state (e.g., power or temperature) of the wearable device 2001 or an environmental state external to the wearable device 2001. The sensor module 2076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2077 may support a specified protocol that allows for coupling with the external electronic device (e.g., the electronic device 2002) wiredly or wirelessly. According to an embodiment, the interface 2077 may include a high definition multimedia interface (HDMI), a universal serial bus (USB) interface, a secure digital (SD) card interface, or an audio interface.

A connecting terminal 2078 may include a connector via which the wearable device 2001 may be physically connected with the external electronic device (e.g., the electronic device 2002). According to an embodiment, the connecting terminal 2078 may include, for example, a HDMI connector, a USB connector, a SD card connector, or an audio connector (e.g., a headphone connector).

The haptic module 2079 may convert an electrical signal into a mechanical stimulus (e.g., a vibration or a movement) or electrical stimulus which may be recognized by a user via his tactile sensation or kinesthetic sensation. The haptic module 2079 may include, for example, a motor, a piezoelectric element, or an electric stimulator.

The camera module 2080 may capture a still image or moving images. According to an embodiment, the camera module 2080 may include one or more lenses, an image sensor, an image signal processor, or a flash.

The power management module 2088 may manage power supplied to the wearable device 2001. The power management module 2088 may be implemented as at least part of, for example, a power management integrated circuit (PMIC).

The battery 2089 may supply power to at least one component of the wearable device 2001. According to an embodiment, the battery 2089 may include, for example, a primary cell which is not rechargeable, a secondary cell which is rechargeable, or a fuel cell.

The communication module 2090 may support establishing a wired communication channel or a wireless communication channel between the wearable device 2001 and the external electronic device (e.g., the electronic device 2002, the electronic device 2004, or the server 2008) and performing communication via the established communication channel. The communication module 2090 may include one or more communication processors that are operable independently from the processor 2020 (e.g., the application processor (AP)) and supports a wired communication or a wireless communication. According to an embodiment, the communication module 2090 may include a wireless communication module 2092 (e.g., a cellular communication module, a short-range wireless communication module, or a global navigation satellite system (GNSS) communication module) or a wired communication module 2094 (e.g., a local area network (LAN) communication module or a power line communication (PLC) module). A corresponding one of these communication modules may communicate with the external electronic device via the first network 2098 (e.g., a short-range communication network, such as Bluetooth™, wireless-fidelity (Wi-Fi) direct, or infrared data association (IrDA)) or the second network 2099 (e.g., a long-range communication network, such as a cellular network, the Internet, or a computer network (e.g., LAN or wide area network (WAN)). These various types of communication modules 2090 may be implemented as a single chip, or may be implemented as multi chips separate from each other.

According to an embodiment, the wireless communication module 2092 may identify and authenticate the wearable device 2001 in a communication network using subscriber information stored in the subscriber identification module 2096.

The antenna module 2097 may include a plurality of antennas to transmit or receive a signal or power to or from the outside (e.g., the external electronic device). According to an embodiment, the communication module 2090 (e.g., the wireless communication module 2092) may transmit or receive a signal to or from an external electronic device via an antenna suitable for a communication scheme.

Some of the above-described components may be coupled mutually and communicate signals (e.g., commands or data) therebetween via an inter-peripheral communication scheme (e.g., a bus, general purpose input/output (GPO), serial peripheral interface (SPI), or mobile industry processor interface (MIPI)).

According to an embodiment, commands or data may be transmitted or received between the wearable device 2001 and the external electronic device 2004 via the server 2008 coupled with the second network 2099. Each of the electronic devices 2002 and 2004 may be a device of a same type as, or a different type, from the wearable device 2001. According to an embodiment, all or some of operations to be executed at the wearable device 2001 may be executed at another external electronic device or a plurality of external electronic devices. According to an embodiment, if the wearable device 2001 should perform a function or a service automatically, or by a request, the wearable device 2001, instead of, or in addition to, executing the function or the service, may request the one or more external electronic devices to perform at least some of functions associated with the function or the service. The external electronic device receiving the request may perform the requested function, or an additional function, and transfer an outcome of the performing to the wearable device 2001. The wearable device 2001 may provide the outcome, with or without further processing of the outcome, for the requested function or service. To that end, a cloud computing, distributed computing, or client-server computing technology may be used, for example.

Figure 15:
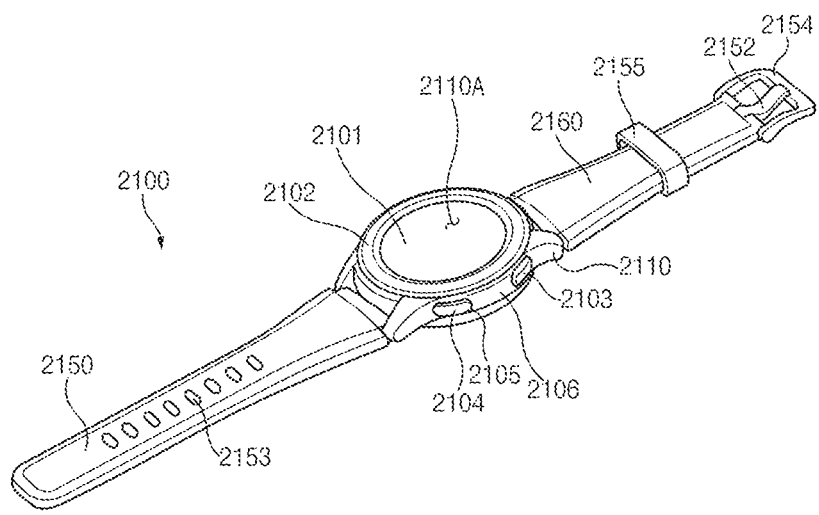
FIG. 15 is a perspective view of the front of a mobile electronic device according to an embodiment.
Figure 16:
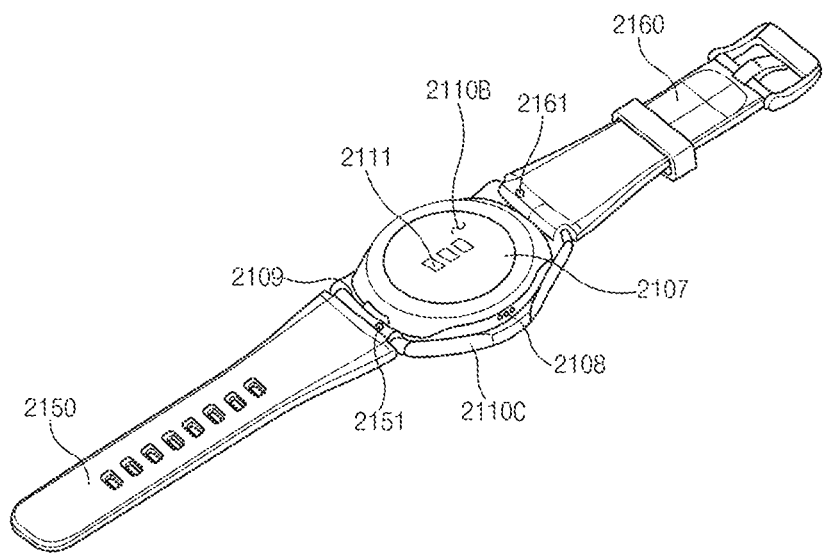
FIG. 16 is a perspective view of the back of the electronic device of FIG. 15.

FIGS. 15 and 16, an electronic device 2100 according to an embodiment (e.g., the wearable electronic device 101 of FIG. 1) may include a housing 2110a (e.g., the housing 120 in FIG. 1) including a first surface (or front surface) 2110A, a second surface (or back surface) 2110B, and a side surface 2110C surrounding the space between the first surface 2110A and the second surface 2110B, and a coupling member 2150 and 160 connected to at least a portion of the housing 2110 and configured to detachably couple the electronic device 2100 to a body part (e.g., wrist, ankle, and so on) of the user. In another embodiment (not illustrated), the housing may refer to a structure forming some of the first surface 2110A, the second surface 2110B, and the side surface 2110C of FIG. 15. According to an embodiment, the first surface 2110A may be formed by a front plate 2101 (e.g., a glass plate or a polymer plate including various coating layers) that is at least partially substantially transparent. The second surface 2110B may be formed by a back plate 2107 that is substantially opaque. The back plate 2107 may be formed, for example, by coated or colored glass, ceramic, polymer, metal (e.g., aluminum, stainless steel (STS), or magnesium), or a combination of at least two of the above materials. The side surface 2110C may be coupled with the front plate 2101 and the back plate 2107 and may be formed by a side bezel structure (or "side member") 2106 that includes metal and/or polymer. In some embodiments, the back plate 2107 and the side bezel structure 2106 may be integrally formed and may include the same material (e.g., a metal material such as aluminum). The coupling member 2150 and 2160 may be formed of various materials and in various shapes. The coupling member 2150 may be formed such that an integrated type and a plurality of unit links are flowable with each other by the woven fabric, leather, rubber, urethane, metal, ceramic, or a combination of at least two of the above materials.

According to an embodiment, the electronic device 2100 may include at least one or more of a display 2120 (see FIG. 16) (e.g., the display 110 of FIG. 1), audio modules 2105 and 108, a sensor module 2111, and key input devices (2102, 103, and 104) and a connector hole 2109. In some embodiments, the electronic device 2100 may omit at least one of the components (e.g., key input devices 2102, 103 and 104, the connector hole 2109, or the sensor module 2111) or may additionally include other components.

The display 2120 may be exposed across a significant portion of the front plate 2101, for example. The shape of the display 2120 may be a shape corresponding to the shape of the front plate 2101, and may have various shapes such as a circular shape, an oval shape, or a polygonal shape. The display 2120 may be combined with or disposed to be adjacent to a touch sensing circuit, a pressure sensor capable of measuring the intensity (pressure) of the touch, and/or a fingerprint sensor.

The audio modules 2105 and 2108 may include a microphone hole 2105 and a speaker hole 2108. In the microphone hole 2105, a microphone for acquiring external sound may be disposed therein, and in some embodiments, a plurality of microphones may be disposed to sense the direction of sound. The speaker hall 2108 may be used as an external speaker and a call receiver. In some embodiments, the speaker holes 2107 and 2114, and the microphone hole 2103 may be implemented as one hole, or a speaker without the speaker holes 2107 and 114 (e.g., a piezo speaker) may be included.

The sensor module 2111 may generate an electrical signal or data value corresponding to an internal operational state (e.g., power or temperature) of the electronic device 2100 or an environmental state external to the electronic device 2100. The sensor module 2111 may include, for example, a biometric sensor module 2111 (e.g., HRM sensor) disposed on the second surface 2110B of the housing 2110. The electronic device 2100 may further include a sensor module that is not illustrated, for example, a at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The key input device 2102, 2103, and 2104 may be disposed on the first surface 2110A of the housing 2110, and may include the wheel key 2102 rotatable in at least one direction, and/or side key buttons 2102 and 103 disposed on the side surface 2110C of the housing 2110. The wheel key may have a shape corresponding to the shape of the front plate 2102. In another embodiment, the electronic device 2100 may not include some or all of the key input devices 2102, 2103, 2104 mentioned above, and the key input devices 2102, 2103, 2104, which is (are) not included, may be implemented in other forms, such as a soft key, on the display 2120. The connector hole 2109 may accommodate a connector (for example, a USB connector) for transmitting and receiving electric power and/or data to and from an external electronic device, and may include another connector hole (not illustrated) capable of receiving a connector for transmitting and receiving audio signals to and from an external electronic device. The electronic device 2100 may further include, for example, a connector cover (not illustrated) that covers at least a portion of the connector hole 2109 and blocks the introduction of external foreign matters into the connector hole.

The coupling members 2150 and 2160 may be detachably coupled to at least a portion of the housing 2110 using locking members 2151 and 2161. The coupling members 2150 and 2160 may include one or more of a fixing member 2152, a fixing member fastening hole 2153, a band guide member 2154, and a band fixing ring 2155.

The fixing member 2152 may be configured to fix the housing 2110 and the coupling members 2150 and 2160 to a body part (e.g., wrist, ankle, and so on) of the user. The fixing member fastening hole 2153 may fix the housing 2110 and the coupling members 2150 and 2160 to a body part of the user corresponding to the fixing member 2152. The band guide member 2154 is configured to limit the range of movement of the fixing member 2152 when the fixing member 2152 is fastened to the fixing member fastening hole 2153, thereby making it possible for the coupling members 2150 and @60 to be closely coupled to the body part of the user. The band fixing ring 2155 may limit the range of movement of the coupling members 2150 and 2160 in a state where the fixing member 2152 and the fixing member fastening hole 2153 are fastened.

Figure 17:
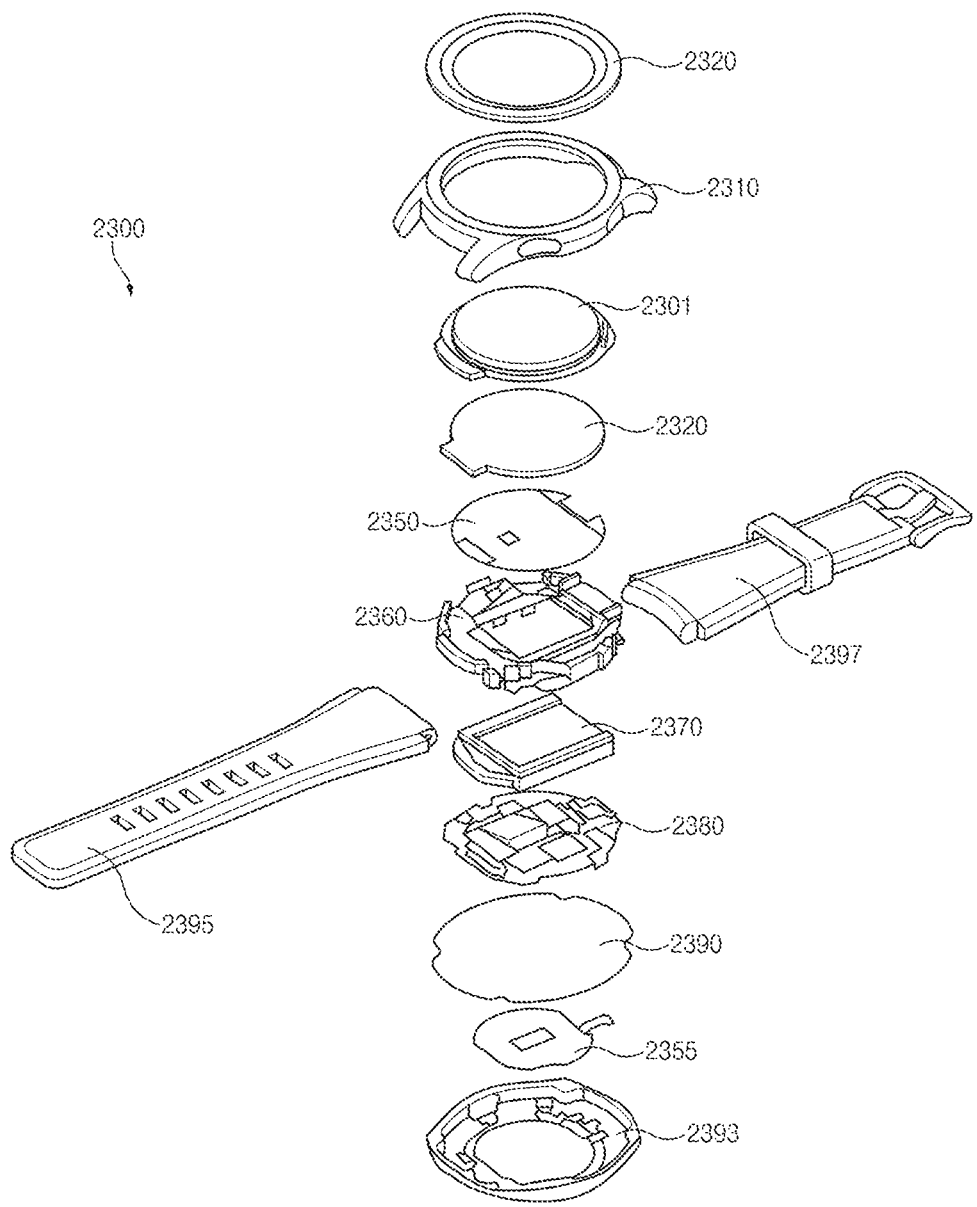
FIG. 17 is an exploded perspective view of the electronic device of FIG. 15.

Referring to FIG. 17, an electronic device 2300 (e.g., the wearable electronic device 101 of FIG. 1) includes a side bezel structure 2310, a wheel key 2320, a front plate 2101, a display 2120, a first antenna 2350, a second antenna 2355, a support member 2360 (e.g., bracket), a battery 2370, a printed circuit board 2380, a sealing member 2390, a back plate 2393, and coupling members 2395 and 2397. At least one of the components of the electronic device 2300 may be the same as or similar to at least one of the components of the electronic device 2100 of FIG. 15 or FIG. 16, and a duplicate description will be omitted below. The support member 2360 may be disposed inside the electronic device 2300 to be connected to the side bezel structure 2310 or may be integrally formed with the side bezel structure 2310. The support member 2360 may be formed of, for example, a metal material and/or a non-metal (e.g., polymer) material. The support member 2360 may have a display 2120 coupled to one surface and the printed circuit board 2380 coupled to the other surface. The printed circuit board 2380 may be equipped with a processor, memory, and/or interface. The processor may include, for example, one or more of a central processing unit, an application processor, a graphic processing unit (GPU), an application processor sensor processor, or a communication processor.

The memory may include a volatile memory or a non-volatile memory. The interface may include a high definition multimedia interface (HDMI), a universal serial bus (USB) interface, a secure digital (SD) card interface, and/or an audio interface. The interface may electrically or physically connect the electronic device 2300 with an external electronic device, for example, and may include a USB connector, an SD card/MMC connector, or an audio connector.

The battery 2370 may supply power to at least one component of the electronic device 2300, and may include, for example, a primary cell which is not rechargeable, a secondary cell which is rechargeable, or a fuel cell. At least a portion of the battery 2370 may be disposed, for example, on substantially the same plane as the printed circuit board 2380. The battery 2370 may be integrally disposed inside the electronic device 2100 or may be disposed to be detachable from the electronic device 2100.

The first antenna 2350 may be disposed between the display 2120 and the support member 2360. The first antenna 2350 may include, for example, a near field communication (NFC) antenna, a wireless charging antenna, and/or a magnetic secure transmission (MST) antenna. The first antenna 2350 may, for example, perform short-range communication with an external device, wirelessly transmit and receive power required for charging, and transmit a short-range communication signal or a self-based signal including payment data. In another embodiment, the antenna structure may be formed by the side bezel structure 2310 and/or a portion of the support member 2360 or a combination thereof.

The second antenna 2355 may be disposed between the circuit board 2380 and the back plate 2393. The second antenna 2355 may include, for example, a near field communication (NFC) antenna, a wireless charging antenna, and/or a magnetic secure transmission (MST) antenna. The second antenna 2355 may, for example, perform short-range communication with an external device, wirelessly transmit and receive power required for charging, and transmit a short-range communication signal or a self-based signal including payment data. In another embodiment, an antenna structure may be formed by the side bezel structure 2310 and/or a portion of the back plate 2393 or a combination thereof.

The sealing member 2390 may be positioned between side bezel structure 2310 and the back plate 2393. The sealing member 2390 may be configured to block moisture and foreign matter introduced into the space surrounded by the side bezel structure 2310 and the back plate 2393 from the outside.

A wearable device according to various embodiments may include a housing forming at least a part of an exterior of the wearable device, a plurality of openings formed in at least a partial region of the housing, an elastic body disposed inside the housing and including a passage spatially connected with the plurality of openings, and at least one microphone sensing vibration introduced from the outside via the plurality of openings and the passage.

According to various embodiments, the wearable device may further include a display, in which the housing may include a first housing covering a front surface of the display and a second housing covering a back surface of the display, and the plurality of openings may be disposed on a side surface of the second housing.

According to various embodiments, the plurality of openings may be disposed in a direction substantially parallel to the display.

According to various embodiments, the housing may include a curved surface having a specified curvature, the plurality of openings may be formed on the curved surface.

According to various embodiments, the plurality of openings may include a first opening, a second opening, and a third opening that are arranged at specified intervals, and a diameter of the second opening may be larger than a diameter of the first opening or a diameter of the third opening.

According to various embodiments, the wearable device may further include a bracket disposed between the elastic body and an inner surface of the housing, in which the bracket may include a plurality of holes facing the plurality of openings.

According to various embodiments, the plurality of openings may have a specified diameter, and the plurality of holes may have different diameters.

According to various embodiments, the elastic body may include a first passage from the plurality of openings toward an interior of the wearable device, and a second passage from the first passage toward the microphone. According to various embodiments, a plurality of the first passages may be provided corresponding to the plurality of openings. According to various embodiments, the elastic body may include a first piece including the first passage, and a second piece including the second passage.

According to various embodiments, the partial region may have an inclined surface, and a region in which the plurality of openings is disposed in the partial region may protrude relatively in an outward direction.

According to various embodiments, the microphone may be at least partially accommodated in the elastic body.

A wearable device according to various embodiments may include a housing forming at least a part of an exterior of the wearable device, a plurality of openings formed in at least a partial region of the housing, an elastic body disposed inside the housing and including a passage spatially connected with the plurality of openings, at least one microphone sensing vibration introduced from the outside via the plurality of openings and the passage, a memory, and a processor configured to control the microphone, in which the processor may be configured to perform a first function if a waveform of the vibration introduced from the outside corresponds to a first waveform stored in the memory, and perform a second function if the waveform corresponds to a second waveform stored in the memory.

According to various embodiments, the first waveform may be stored in association with a first gesture input of a user generated at a first distance from the wearable device, and the second waveform may be stored in association with a second gesture input of the user generated at a second distance from the wearable device.

According to various embodiments, the processor may be configured to activate the microphone corresponding to an operation of the user lifting the wearable device.

According to various embodiments, the wearable device may further include a display configured to display at least one graphic object, in which the processor may be configured to move the at least one graphic object displayed on the display in a first direction corresponding to the first gesture input, and move the at least one graphic object displayed on the display in a second direction corresponding to the second gesture input.

According to various embodiments, the processor may be configured to perform an operation corresponding to the at least one graphic object displayed on the display when the first gesture inputs are generated multiple times within a specified time, and refrain from the performing of the operation corresponding to the at least one graphic object when the second gesture input is generated multiple times within a specified time.

A wearable device according to various embodiments may include a housing forming at least a part of an exterior of the wearable device, a plurality of openings formed in at least a partial region of the housing, at least one microphone sensing sound or vibration introduced from the outside via the plurality of openings, and a processor, in which the processor may be configured to sense vibration corresponding to a contact between a plurality of fingers of the user using the microphone, perform a first function if the sensed vibration is determined as a first vibration corresponding to a motion of a first finger of the user, and perform a second function if the sensed vibration is determined as a second vibration corresponding to a motion of a second finger of the user.

According to various embodiments, the processor may be configured to determine the vibration corresponding to a contact between the first finger and a third finger as the first vibration.

According to various embodiments, the processor may be configured to determine the vibration corresponding to the contact between the second finger and the third finger as the second vibration.

Each component according to various embodiments may be made up of a singular or a plurality of entities, and some of the aforementioned sub-components may be omitted, or other sub-components may be further included in various embodiments. Alternatively or additionally, some components (e.g., modules or programs) may be integrated into one entity, performing the same or similar functions performed by respective corresponding components before integration. Operations performed by a module, program, or another component according to various embodiments may be sequentially, parallelly, repeatedly, or heuristically executed, at least some operations may be executed in a different order, omitted, or other operations may be added.

The invention claimed is:

1. A wearable device comprising:
   a housing forming at least a part of an exterior of the wearable device;
   a plurality of openings formed on a side surface of the housing;
   at least one microphone; and
   an elastic body disposed inside the housing and including a passage for spatially connecting between the plurality of openings and the at least one microphone inside the housing,
   wherein the plurality of openings and the passage transmit vibration generated by an external object to the at least one microphone, and
   wherein the at least one microphone sense the vibration.

2. The wearable device of claim 1, further comprising a display,
   wherein the housing includes a first housing covering a front surface of the display and a second housing covering a back surface of the display, and
   the plurality of openings are disposed on a side surface of the second housing.

3. The wearable device of claim 2, wherein the plurality of openings are disposed in a direction substantially parallel to the display.

4. The wearable device of claim 1, wherein the housing includes a curved surface having a specified curvature, and
   the plurality of openings are formed on the curved surface.

5. The wearable device of claim 1, wherein the plurality of openings include a first opening, a second opening, and a third opening that are arranged at specified intervals, and
   a diameter of the second opening is larger than a diameter of the first opening or a diameter of the third opening.

6. The wearable device of claim 1, further comprising a bracket disposed between the elastic body and an inner surface of the housing,
   wherein the bracket includes a plurality of holes facing the plurality of openings.

7. The wearable device of claim 6, wherein the plurality of openings have a specified diameter, and
   the plurality of holes have different diameters.

8. The wearable device of claim 1, wherein the elastic body includes:
   a first passage from the plurality of openings toward an interior of the wearable device; and
   a second passage from the first passage toward the at least one microphone.

9. The wearable device of claim 8, wherein a plurality of the first passages are provided corresponding to the plurality of openings.

10. The wearable device of claim 8, wherein the elastic body includes:
a first piece including the first passage; and
a second piece including the second passage.

11. The wearable device of claim 1, wherein the side surface has an inclined region, and
the plurality of openings are disposed in the region protrudes relatively in an outward direction.

12. The wearable device of claim 1, wherein the at least one microphone is at least partially accommodated in the elastic body.

13. The wearable device of claim 1, further comprising:
a memory; and
a processor configured to control the at least one microphone,
wherein the processor is configured to:
perform a first function if a waveform of the vibration introduced from outside corresponds to a first waveform stored in the memory; and
perform a second function if the waveform corresponds to a second waveform stored in the memory.

14. The wearable device of claim 13, wherein the first waveform is stored in association with a first gesture input of a user generated at a first distance from the wearable device, and
the second waveform is stored in association with a second gesture input of the user generated at a second distance from the wearable device.

15. The wearable device of claim 14, further comprising a display configured to display at least one graphic object,
wherein the processor is configured to:
move the at least one graphic object displayed on the display in a first direction corresponding to the first gesture input; and
move the at least one graphic object displayed on the display in a second direction corresponding to the second gesture input.

* * * * *